United States Patent
Shigeta et al.

(10) Patent No.: US 9,912,886 B2
(45) Date of Patent: Mar. 6, 2018

(54) IMAGE CAPTURING APPARATUS AND DRIVING METHOD OF IMAGE SENSOR

(71) Applicant: CANON KABUSHIKI KAISHA, Tokyo (JP)

(72) Inventors: Kazuyuki Shigeta, Yokohama (JP); Noriyuki Kaifu, Hachioji (JP); Hisashi Takado, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/956,798

(22) Filed: Dec. 2, 2015

(65) Prior Publication Data
US 2016/0182839 A1   Jun. 23, 2016

(30) Foreign Application Priority Data

Dec. 17, 2014  (JP) ................... 2014-255443
Nov. 4, 2015  (JP) ................... 2015-217008

(51) Int. Cl.
| | |
|---|---|
| H04N 5/335 | (2011.01) |
| H04N 5/3745 | (2011.01) |
| H04N 5/235 | (2006.01) |
| H04N 5/355 | (2011.01) |

(52) U.S. Cl.
CPC ....... H04N 5/35581 (2013.01); H04N 5/2357 (2013.01); H04N 5/35554 (2013.01); H04N 5/37452 (2013.01); H04N 5/2355 (2013.01)

(58) Field of Classification Search
CPC ........... H04N 5/37452; H04N 5/35554; H04N 5/2357; H04N 5/2355
See application file for complete search history.

(56) References Cited

U.S. PATENT DOCUMENTS

| | | | |
|---|---|---|---|
| 4,922,117 A | 5/1990 | Saika et al. | |
| 4,939,592 A | 7/1990 | Saika et al. | |
| 6,271,880 B1 | 8/2001 | Kameshima et al. | |
| (Continued) | | | |

FOREIGN PATENT DOCUMENTS

| | | |
|---|---|---|
| JP | 2006-246450 A | 9/2006 |
| JP | 2007-006049 A | 1/2007 |

OTHER PUBLICATIONS

Hisashi Takado, U.S. Appl. No. 14/874,636, filed Oct. 5, 2015.
Hisashi Takado, U.S. Appl. No. 14/926,125, filed Oct. 29, 2015.

*Primary Examiner* — Christopher K Peterson
(74) *Attorney, Agent, or Firm* — Fitzpatrick, Cella, Harper & Scinto

(57) ABSTRACT

An image capturing apparatus is provided. The apparatus comprises an image sensor comprising pixels and a controller. The pixels include a photoelectric converter, a holding unit, an output unit and a first and second transfer unit. The controller causes the sensor to repeatedly perform a holding operation that the first transfer unit transfer charge from the photoelectric conversion unit to the holding unit, and a transfer operation that the second transfer unit transfer the charge from the holding unit to the output unit. The controller causes the sensor to perform, as the holding operation, holding operations including a first holding operation for performing the first transfer unit transfer charge generated in a first exposure time and a second holding operation for performing the first transfer unit transfer charge generated in a second exposure time longer than the first exposure time.

21 Claims, 10 Drawing Sheets

(56) References Cited

U.S. PATENT DOCUMENTS

| | | |
|---|---|---|
| 6,717,151 B2 | 4/2004 | Tashiro et al. |
| 6,798,453 B1 | 9/2004 | Kaifu |
| 6,800,836 B2 | 10/2004 | Hamamoto et al. |
| 7,129,458 B2 | 10/2006 | Hamamoto et al. |
| 7,859,575 B2 | 12/2010 | Ota et al. |
| 8,189,086 B2 | 5/2012 | Hashimoto et al. |
| 8,284,299 B2 | 10/2012 | Tanaka et al. |
| 8,310,576 B2 | 11/2012 | Hashimoto et al. |
| 8,390,710 B2 | 3/2013 | Shigeta et al. |
| 8,553,119 B2 | 10/2013 | Hashimoto et al. |
| 8,624,992 B2 | 1/2014 | Ota et al. |
| 8,836,832 B2 | 9/2014 | Shigeta et al. |
| 8,928,789 B2 | 1/2015 | Hashimoto et al. |
| 9,049,389 B2 | 6/2015 | Hashimoto et al. |
| 9,191,600 B2 | 11/2015 | Hashimoto et al. |
| 2010/0157083 A1 | 6/2010 | Ohya et al. |
| 2010/0321532 A1 | 12/2010 | Hashimoto et al. |
| 2011/0007196 A1 | 1/2011 | Yamashita et al. |
| 2013/0044247 A1* | 2/2013 | Kawahito .......... H04N 5/35581 348/296 |
| 2014/0253752 A1 | 9/2014 | Kawano et al. |
| 2015/0083895 A1 | 3/2015 | Hashimoto et al. |
| 2015/0163421 A1 | 6/2015 | Shigeta |
| 2015/0222831 A1 | 8/2015 | Hashimoto et al. |

\* cited by examiner

IMAGE CAPTURING APPARATUS AND DRIVING METHOD OF IMAGE SENSOR

BACKGROUND OF THE INVENTION

Field of the Invention

The present invention relates to an image capturing apparatus and a driving method for an image sensor.

Description of the Related Art

On-board and monitoring image capturing apparatuses are generally required to have wide dynamic range performance. In addition, digital still cameras and digital video cameras have been required to have wide dynamic range performance. Under the circumstances, there is known a method of generating an image having a wide dynamic range by combining an image with a short exposure time and an image with a long exposure time.

Meanwhile, many of light sources such as LED light sources and fluorescent lamps blink in synchronism with commercial power supply. For this reason, if performing image capturing with a short exposure time, a light source which appears lit to the human eye is sometimes captured so as not to appear lit in a still image. In addition, the light source is sometimes captured to look rapidly blinking on a moving image.

Japanese Patent Laid-Open No. 2007-6049 discloses a technique of detecting the fluctuation cycle of a light source by using a fluctuation detection unit for detecting the energy fluctuation cycle of illumination. An overall exposure period is decided in accordance with this fluctuation cycle. This exposure period is alternately divided into effective and ineffective exposure periods at a predetermined ratio. There is disclosed an image capturing apparatus configured to acquire an image with a short exposure time in accordance with the fluctuation cycle of a light source by converting only charges, of the charges accumulated by an image capturing unit, which have been accumulated during effective exposure periods into an electrical signal.

SUMMARY OF THE INVENTION

In order to realize both the enlargement of a dynamic range and the suppression of the influence of light source blinking, the image capturing apparatus disclosed in Japanese Patent Laid-Open No. 2007-6049 is configured to alternately perform image capturing with a short exposure time and a long exposure time for each frame. However, the present inventors have found that such an apparatus has difficulty in correctly acquiring images. If the image capturing apparatus disclosed in Japanese Patent Laid-Open No. 2007-6049 performs image capturing with a short exposure time, the photoelectric conversion unit needs to perform charge discharge and charge transfer a plurality of times. Therefore, the apparatus requires a memory such as a floating diffusion memory. Charges generated by the photoelectric conversion unit during an effective exposure period at the nth frame are intermittently transferred to the memory during the period of the same nth frame, and are sequentially transferred from the memory to a storage unit on the subsequent stage over a period to the (n+1)th frame. The image capturing apparatus disclosed in Japanese Patent Laid-Open No. 2007-6049 alternatively divides one frame into effective and ineffective exposure periods at a predetermined ratio for image capturing with a short exposure time. For this reason, when the apparatus has performed image capturing with a short exposure time at the (n+1)th frame, charges at the nth frame may be superimposed on charges at the (n+1)th frame in the memory. This makes it difficult to perform image capturing with different exposure times at consecutive frames. In order to acquire one image having a wide dynamic range by combining images with a plurality of different exposure times while ensuring a frame rate, it is desirable to output images captured with different exposure times at consecutive frames. Some of the embodiments of the present invention provide techniques of acquiring an image having a wide dynamic range while suppressing the influence of the blinking of a light source in an image capturing apparatus.

According to some embodiments, an image capturing apparatus comprising an image sensor and a control unit configured to control the image sensor, the image sensor including a plurality of pixels, each of the plurality of pixels including a photoelectric conversion unit, a charge holding unit, an output unit, a first transfer unit configured to transfer charge generated by the photoelectric conversion unit to the charge holding unit, and a second transfer unit configured to transfer charge held in the charge holding unit to the output unit, wherein the control unit causes the image sensor to repeatedly perform a holding operation and a transfer operation, the holding operation being for making the first transfer unit transfer charge generated by the photoelectric conversion unit to the charge holding unit to hold the charge, and the transfer operation being for making the second transfer unit transfer the charge held in the charge holding unit to the output unit, and the control unit causes the image sensor to perform, as the holding operation, one or more of a plurality of holding operations including a first holding operation and a second holding operation, the first holding operation being for performing, a plurality of times in a period of one frame, a first sampling operation of making the first transfer unit transfer charge generated by the photoelectric conversion unit in a first exposure time to the charge holding unit to hold the charge, and the second holding operation being for performing, not less than once in the period of one frame, a second sampling operation of making the first transfer unit transfer charge generated by the photoelectric conversion unit in a second exposure time longer than the first exposure time to the charge holding unit to hold the charge, is provided.

According to some other embodiments, a driving method for an image sensor including a plurality of pixels, each of the plurality of pixels of the image sensor including one photoelectric conversion unit, at least two charge holding units, an output unit, a transfer unit configured to transfer charge from the photoelectric conversion unit to one charge holding unit, a transfer unit configured to transfer charge from the photoelectric conversion unit to the other charge holding unit, a transfer unit configured to transfer charge from the one charge holding unit to the output unit, and a transfer unit configured to transfer charge from the other charge holding unit to the output unit, and the driving method for the image sensor comprising: performing repeatedly a plurality of operations, the operations including: transferring charge to the other charge holding unit to hold the charge while charge is held in the one charge holding unit; and transferring charge from the one charge holding unit while charges are held in the two charge holding units, is provided.

According to some other embodiment, a driving method for an image sensor including a plurality of pixels, each of the plurality of pixels including a photoelectric conversion unit, a charge holding unit, an output unit, a first transfer unit configured to transfer charge generated by the photoelectric conversion unit to the charge holding unit, and a second transfer unit configured to transfer charge held in the charge holding unit to the output unit, wherein the driving method for the image sensor comprises performing repeated operations, the operations include making the first transfer unit transfer charge generated by the photoelectric conversion unit to the charge holding unit to hold the charge and making the second transfer unit transfer the charge held in the charge holding unit to the output unit, and as the making the first transfer unit transfer the charge, one or more of a plurality of holding operations are performed, including performing, a plurality of times in a period of one frame, a first sampling operation of making the first transfer unit transfer charge generated by the photoelectric conversion unit in a first exposure time to the charge holding unit to hold the charge, and performing, not less than once in the period of one frame, a second sampling operation of making the first transfer unit transfer charge generated by the photoelectric conversion unit in a second exposure time longer than the first exposure time to the charge holding unit to hold the charge, is provided.

Further features of the present invention will become apparent from the following description of exemplary embodiments (with reference to the attached drawings).

DESCRIPTION OF THE EMBODIMENTS

Figure 1:
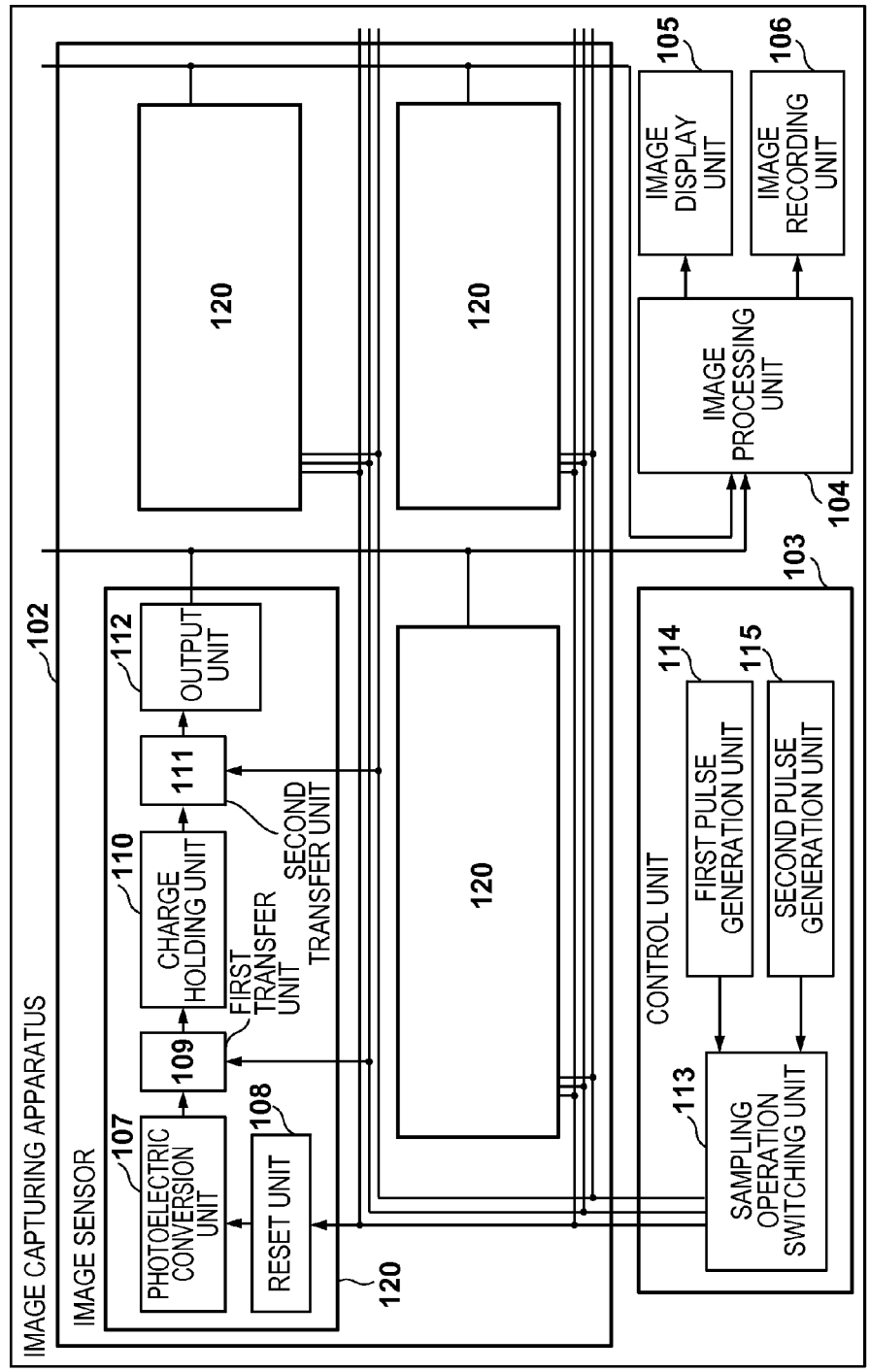
FIG. 1 is a block diagram of an image capturing apparatus according to a first embodiment of the present invention.

Specific embodiments of an image capturing apparatus according to the present invention will be described below with reference to the accompanying drawings. Note that in the following description and drawings, common reference numerals denote common constituent elements throughout a plurality of drawings. For this reason, each common constituent element will be described with cross reference to a plurality of drawings, and a description of constituent elements denoted by common reference numerals will be omitted as appropriate.

The structure of an image capturing apparatus and a driving method for the image capturing apparatus according to an embodiment of the present invention will be described with reference to FIGS. 1 to 5B. FIG. 1 is a block diagram schematically showing an example of the arrangement of an image capturing apparatus 101 according to a first embodiment of the present invention. The image capturing apparatus 101 according to this embodiment is, for example, an on-board or monitoring moving image recording camera which includes a display unit which displays an image with an extended dynamic range and a built-in recording medium unit which records an image with an extended dynamic range. The image capturing apparatus 101 includes an image sensor 102, a control unit 103, an image processing unit 104, an image display unit 105, and an image recording unit 106.

The image sensor 102 has a plurality of pixels two-dimensionally arranged in an array. FIG. 1 shows four pixels 120. The image sensor 102 has the plurality of pixels 120 two-dimensionally arranged in an array. Each pixel 120 of the image sensor 102 includes a photoelectric conversion unit 107, a reset unit 108, a first transfer unit 109, a charge holding unit 110, a second transfer unit 111, and an output unit 112. The photoelectric conversion unit 107 is, for example, a photodiode having a function of converting incident light into an electrical signal such as charges. The reset unit 108 resets the potential of the charges in the photoelectric conversion unit 107. The first transfer unit 109 transfers charges generated by the photoelectric conversion unit 107 to the charge holding unit 110. The charge holding unit 110 temporarily holds the charges. The second transfer unit 111 transfers the charges held in the charge holding unit 110 to the output unit 112 which is the subsequent stage circuit of the image sensor 102. The output unit 112 outputs an image from the image sensor 102 to the image processing unit 104. A series of operations of making the image sensor 102 generate charges corresponding to incident light and hold the charges in the charge holding unit 110 is called a sampling operation. A sampling operation in this embodiment is constituted by a reset operation of resetting the potential of charges in the photoelectric conversion unit 107, an exposure operation of waiting for the accumulation of charges in the photoelectric conversion unit 107, and an operation of transferring the charges accumulated in the photoelectric conversion unit 107 to the charge holding unit 110 and holding the charges. The time required for an exposure operation is called the exposure time.

The control unit 103 will be described next. The control unit 103 generates pulse signals for driving the image sensor 102. The control unit 103 includes a sampling operation switching unit 113, a first pulse generation unit 114, and a second pulse generation unit 115. The sampling operation switching unit 113 has a function of sequentially switching timings, of timings for supplying pulse signals for driving the image sensor 102, which are associated with the above sampling operation for each frame of an image. The first pulse generation unit 114 and the second pulse generation unit 115 generate pulse signals for a sampling operation. The pulse signals generated by the respective pulse generation units are sequentially switched by the sampling operation switching unit 113 for each of a plurality of consecutive frames and are sent from the control unit 103 to the image sensor 102.

The first pulse generation unit 114 generates pulse signals for causing the image sensor 102 to perform a first charge transfer operation including a first holding operation and a first transfer operation. The first holding operation is the operation of performing a sampling operation with the first exposure time, which is a short exposure time, a plurality of times during the period of one frame. A sampling operation with a short exposure time is called a short-time sampling operation. The short-time sampling operation is also called the first sampling operation. The first transfer operation is the operation of transferring signal charges held in the charge holding unit 110 by the first holding operation to the output unit 112. With the first charge transfer operation, signal charges generated by a plurality of short-time sampling operations are superimposed in the charge holding unit 110, and are then transferred to the output unit 112. That is, the image sensor 102 outputs an image multiple-exposed in a short exposure time.

The second pulse generation unit 115 generates pulse signals for causing the image sensor 102 to perform a second charge transfer operation including a second holding operation and a second transfer operation. The second holding operation is the operation of performing a sampling operation with the second exposure time, which is a long exposure time, one or more times during the period of one frame. A sampling operation with a long exposure time is called a long-time sampling operation. The long-time sampling operation is also called the second sampling operation. The exposure time of the long-time sampling operation is longer than that of the short-time sampling operation. In this embodiment, in the second holding operation, a long-time sampling operation is performed only once during period of one frame. The second transfer operation is the operation of transferring signal charges held in the charge holding unit 110 by the second holding operation to the output unit 112. With the second charge transfer operation, signal charges generated by one long-time sampling operation are held in the charge holding unit 110, and are then transferred to the output unit 112. That is, the image sensor 102 outputs an image single-exposed in a long exposure time.

In this embodiment, a pulse signal for the execution of the first transfer operation may be identical to a pulse signal for the execution of the second transfer operation. For this reason, the control unit 103 may have another pulse generation unit which generates this pulse signal in place of the first pulse generation unit 114 and the second pulse generation unit 115. In this case, the sampling operation switching unit 113 supplies a pulse signal generated by this another pulse generation unit to the image sensor 102.

Pulse signals sent to the image sensor 102 by the sampling operation switching unit 113 cause the image sensor 102 to repeatedly perform the above charge transfer operation. In addition, the pulse signals cause the image sensor 102 to cyclically switch and perform the first and second charge transfer operations. This makes the image sensor 102 sequentially and cyclically output images multiple-exposed in short exposure times and images single-exposed in long exposure times for each frame and send the resultant images to the image processing unit 104.

The image processing unit 104 processes images captured by the image sensor 102. The image processing unit 104 has a function of receiving signals from the image sensor 102, combining at least two images with different exposure times, and generating an image with an extended dynamic range. The image processing unit 104 also has a function of converting a pixel arrangement signal from an image sensor with a Bayer arrangement into a general video signal such as an RGB signal or YCbCr signal. In addition, the image processing unit 104 includes an IF (InterFace) function of generating a display signal to the image display unit 105 and an IF function of generating a recording signal to the image recording unit 106. The image display unit 105 is formed from, for example, liquid crystal elements or EL elements, and displays images processed by the image processing unit 104. The image recording unit 106 is formed from, for example, a hard disk or nonvolatile memory, and records images processed by the image processing unit 104.

Figure 2:
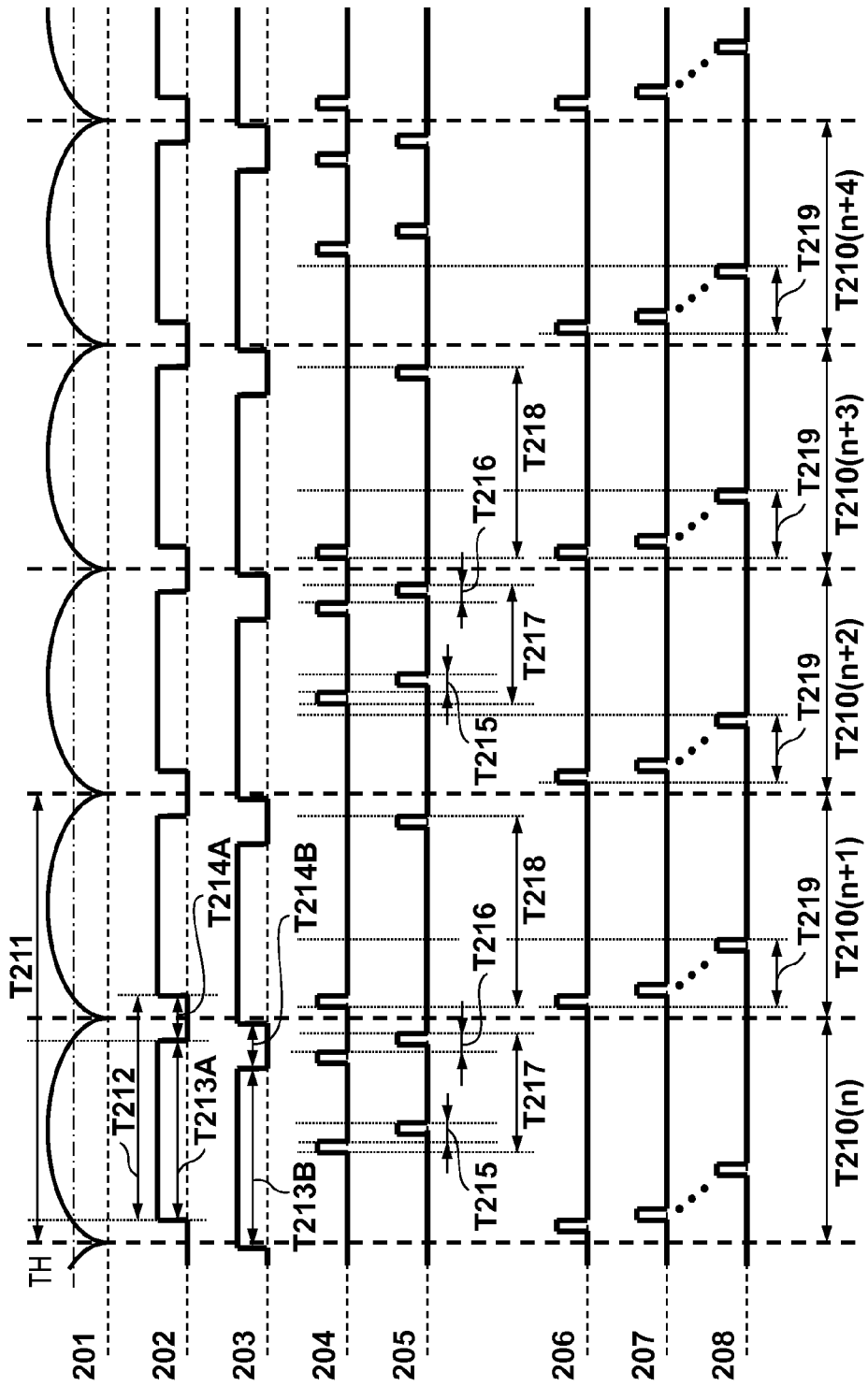
FIG. 2 is a timing chart for explaining the operation of the image capturing apparatus in FIG. 1.

FIG. 2 is a timing chart for explaining the operation of the image capturing apparatus 101 according to this embodiment. Periods T210(n), T210(n+1), T210(n+2), T210(n+3), and T210(n+4) respectively indicate the frame periods of the nth, (n+1)th, (n+2)th, (n+3)th, and (n+4)th frames. Each frame corresponds to outputting one image from the image sensor 102 to the image processing unit 104.

A waveform 201 schematically indicates, for example, a waveform obtained by full-wave rectification of commercial AC power supply with 50 Hz or 60 Hz. A period T211 indicates the AC cycle of commercial power supply, and is, for example, 1/50 sec or 1/60 sec.

A waveform 202 indicates the ON state of an LED light source such as a traffic signal machine using power supply with the waveform 201. "H" level and "L" level respectively indicate an ON state and an OFF state. In this case, when the waveform 201 of full-wave rectified power supply is equal to or more than a threshold level TH, the waveform 202 is set in the ON state. When the waveform 201 is less than the threshold level TH, the waveform 202 is set in the OFF state. A waveform 203 schematically indicates an ON state when the waveform 202 differs from a blinking phase. A period T212 indicates the blinking cycle of the light source, which is 1/2 the period T211. Periods T213A and T213B indicate periods during which the light source is ON, and periods T214A and T214B indicate periods during which the light source is OFF.

A signal waveform 204 indicates the waveform of a pulse signal which is output from the sampling operation switching unit 113 to the reset unit 108 to reset the potential of the photoelectric conversion unit 107. "H" level and "L" level respectively indicate a reset state and a non-reset state. In this embodiment, the photoelectric conversion units 107 of all the pixels 120 arranged in an array on the image sensor 102 are collectively and simultaneously reset. For this purpose, reset signals, each with "H" level of the signal waveform 204, are input to the reset units 108 of all the pixels 120 at the same timing.

A signal waveform 205 indicates the waveform of a pulse signal output from the sampling operation switching unit 113 to the first transfer unit 109. When the signal waveform 205 is set at "H" level, the first transfer unit 109 is turned on to transfer charges generated by the photoelectric conversion unit 107 to the charge holding unit 110. When the signal waveform 205 is at "L" level, the first transfer unit 109 is turned off to transfer no charges from the photoelectric conversion unit 107 to the charge holding unit 110. In this embodiment, in all the pixels 120 arranged in an array, charges generated by the photoelectric conversion units 107 are simultaneously transferred to the charge holding units 110. For this purpose, transfer signals, each with "H" level of the signal waveform 205, are input to the first transfer units 109 of all the pixels 120 at the same timing. The image capturing apparatus 101 implements a global electronic shutter, that is, simultaneously exposing all the pixels 120 arranged in an array, by using reset signals indicated by the signal waveform 204 for the photoelectric conversion units 107 and transfer signals represented by the signal waveform 205 for the first transfer units 109.

Periods T215 and T216 respectively indicate the periods of short-time sampling operations described above. In addition, a period T217 indicates a period from the start of the first sampling operation to the end of the last sampling operation of a plurality of short-time sampling operations performed within one frame. In this embodiment, two sampling operations in the periods T215 and T216 are performed during the period T217. Charges generated in the two periods T215 and T216 are sampled and transferred to each charge holding unit 110 to be added. As a result, the charge holding unit 110 forms an image multiple-exposed in short exposure times.

A period T218 indicates the period of a long-time sampling operation described above. A long-time sampling operation is performed during the period T218, and charges generated in the period are sampled. As a result, each charge holding unit 110 forms an image single-exposed in a long exposure time.

Assume that a short-time sampling operation and a long-time sampling operation start when the reset signal represented by the signal waveform 204 from the reset unit 108 to the photoelectric conversion unit 107 changes from "L" level to "H" level. Assume also that each sampling operation ends when the transfer signal represented by the signal waveform 205 from the sampling operation switching unit 113 to the first transfer unit 109 changes from "H" level to "L" level.

Signal waveforms 206, 207, and 208 represent the waveforms of pulse signals output from the sampling operation switching unit 113 to the second transfer unit 111 to perform the first and second transfer operations of transferring charges temporarily held in each charge holding unit 110 to the corresponding output unit 112. When the signal waveforms 206 to 208 are at "H" level, the second transfer unit 111 is turned on to transfer charges temporarily held in the charge holding unit 110 to the output unit 112. When the signal waveforms 206 to 208 are at "L" level, the second transfer unit 111 is turned off to transfer no charges from the charge holding unit 110 to the output unit 112. In this case, the signal waveform 206 is the waveform of a signal for transferring charges held in the charge holding unit 110 of each pixel 120 on the first row of the image sensor 102 to the corresponding output unit 112. Likewise, the signal waveform 207 is the waveform of a signal for transferring charges held in the charge holding unit 110 of each pixel 120 on the second row of the image sensor 102 to the corresponding output unit 112. In addition, the signal waveform 208 is the waveform of a signal for transferring charges held in the charge holding unit 110 of each pixel 120 on the last row to the corresponding output unit 112. A period T219 is a transfer period during which image data corresponding to one frame are sequentially output from the charge holding units 110 to the output units 112 for each row in the vertical direction in accordance with the signal waveforms 206 to 208.

In this manner, with the global electronic shutter function, the charge holding units 110 collectively and temporarily hold charges generated by the photoelectric conversion units 107 of the pixels 120 arranged in an array on the image sensor 102. Subsequently, the charge holding units 110 sequentially output charges to the output units 112, thereby outputting a frame image corresponding to one screen.

Charges sampled in the period T217 at the nth frame represented by a period T210(n) are transferred to the output units 112 for each row during a period T219 in a period T210(n+1) at the (n+1)th frame, and are output from the image sensor 102 to the image processing unit 104. Subsequently, charges sampled in the period T218 at the (n+1)th frame are transferred to the output units 112 for each row during the period T219 in a period T210(n+2) at the (n+2)th frame, and are further output from the image sensor 102 to the image processing unit 104. The sampling operation switching unit 113 sequentially switches sampling signals to the image sensor 102 for each frame to cause the image sensor 102 to output an image with a short exposure time and an image with a long exposure time to the image processing unit 104 for each frame. More specifically, the image sensor 102 outputs an image with a short exposure time at an odd-numbered frame, and outputs an image with a long exposure time at an even-numbered frame. The image processing unit 104 performs image combining for dynamic range extension by using these images with different exposure times.

Assume that the interval between a plurality of short-time sampling operations performed in the periods T215 and T216, that is, the interval from the start of the first short-time sampling operation to the start of the next short-time sampling operation, is ½ or less the period of one frame. For example, this interval may be set to ½ or less the blinking cycle of the light source used for image capturing. In the period T217, the blinking of the light source is sampled a plurality of times at a frequency twice or more the blinking of the light source, and the resultant data are added. Even if any of a plurality of short-time sampling operations is performed at an OFF time, it is highly possible that another short-time sampling operation is performed at an ON time within the same frame. This increases the possibility that the non-detection of an ON state can be prevented even with a short exposure time.

Assume that in a frame for the execution of short-time sampling operations, the sampling operation in the period T215 is not performed, and only the sampling operation in the period T216 is performed, that is, single exposure is performed. In this case, since the period T213A of the waveform 202, during which the light source is ON, overlaps the period T216, the ON state can be detected. In contrast to this, consider the waveform 203 which differs in blinking phase from the waveform 202. In this case, since the period T214B during which the light source is OFF overlaps the sampling operation in the period T216, the ON state cannot be detected. This can lead to failure to recognize the turn-on of the light source. Assume that the red light of a traffic signal machine is ON in a bright daytime environment. In this case, image capturing with a short exposure time can lead to a false detection indicating that the light is not ON. Even if the blinking phase of the light source corresponds to the waveform 203, it is possible to prevent such a false detection by performing short-time sampling operations in the periods T215 and T216 and making the charge holding unit 110 add charges generated by the photoelectric conversion unit 107.

This embodiment exemplifies the case in which the number of times of short-time sampling operations in the period of one frame is set to two, and sampling is performed at intervals ½ the blinking cycle of the light source. For example, sampling may be performed more times. Increasing the number of times of short-time sampling operations can improve the detection accuracy of the blinking light source and suppress the fluctuations of detected images.

Assume also that the period T217 is at least ½ or more the period of one frame. For example, the period T217 may be ½ or more the blinking cycle of the light source. Alternatively, for example, the period T217 may be equal to a period, in the blinking cycle of the light source, during which the light source is ON. In this embodiment, the period T217 is set to ½ the blinking cycle of the light source for the following reason. Consider, for example, a light source such as a traffic signal machine which performs turn-on/off control by full-wave rectification using commercial power supply. In this case, a period during which many light sources are ON is longer than a period during which the light sources are OFF. For this reason, performing sampling a plurality of times in at least a period ½ or more the blinking cycle of the light source makes it possible to perform sampling at least once in a period during which the light source is ON. However, in a light source such as an illumination which performs brightness control by controlling an ON ratio, when, for example, the luminance is decreased, the ratio of an ON period to the blinking cycle of the light source may become less than ½. A driving method for the image capturing apparatus in this case will be described in the following embodiment.

In this embodiment, the period T219 during which the first and second transfer operations are performed is set to a constant time both in a frame in which short-time sampling operations are performed and a frame in which a long-time sampling operation is performed. In this case, the period T219 is shorter than ½ the period of one frame. In addition, the period T219 is shorter than ½ the period T212 which is the blinking cycle of the light source. When a period during which charges generated by each photoelectric conversion unit 107 are transferred to the corresponding charge holding unit 110 overlaps the period T219 during which the charge holding unit 110 sequentially transfers charges to the output unit 112, the amount of charges in the charge holding unit 110 changes during a vertical scan of an image output. The period T219 is set to prevent this. Attention should be paid to the setting of the period T219 in a frame in which short-time sampling operations are performed. In this embodiment, this period is set to make the charge holding unit 110 transfer charges to the output unit within a time shorter than ½ the period T212 which is the blinking cycle of the light source even in a frame in which a long-time sampling operation is performed as in a frame in which short-time sampling operations are performed. Matching the timings of transferring charges from the charge holding unit 110 to the output unit 112 in all frames can simplify the image input circuit arrangement of the image processing unit 104 on the subsequent stage of the image sensor 102. This can implement a low-cost image capturing apparatus.

Figure 3:
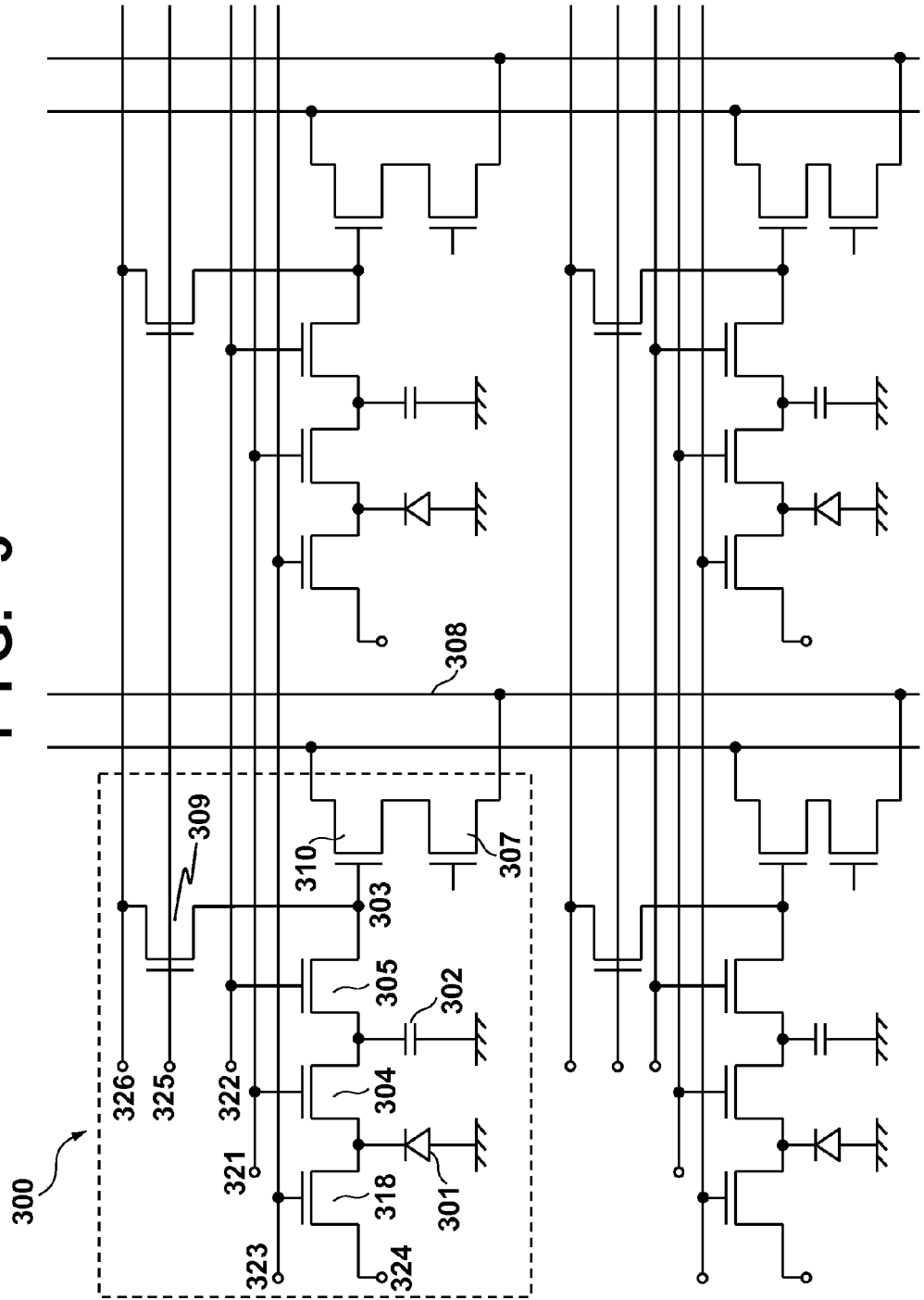
FIG. 3 is an equivalent circuit diagram of a pixel portion of the image capturing apparatus in FIG. 1.

FIG. 3 shows an example of the arrangement of an equivalent circuit of a pixel portion of the image sensor 102 of the image capturing apparatus 101 according to this embodiment. Although FIG. 3 shows four pixels 300, the image sensor 102 has many pixels 300 two-dimensionally arranged in an array. The pixels 300 correspond to the pixels 120 in FIG. 1. Each pixel 300 includes a photodiode 301 corresponding to the photoelectric conversion unit 107, a capacitor 302 corresponding to the charge holding unit 110, a first transfer switch 304 corresponding to the first transfer unit 109, and a second transfer switch 305 corresponding to the second transfer unit 111. The pixel 300 further includes an amplifier 310 corresponding to the output unit 112, a reset transistor 309, a selection transistor 307, and an input node 303.

The photodiode 301 accumulates charges generated by incident light and is one example of the photoelectric conversion unit 107. The first transfer switch 304 transfers charges generated by the photodiode 301 to the capacitor 302. The capacitor 302 temporarily holds charges generated by the photodiode 301 by using incident light. The second transfer switch 305 transfers charges temporarily held in the capacitor 302 to the input node 303 of the amplifier 310. The selection transistor 307 selects the pixel 300 which outputs a signal to an output line 308. The amplifier 310 of the selected pixel 300 outputs a signal based on charges generated by incident light to the output line 308. The reset transistor 309 resets the voltage of the input node 303 of the amplifier 310 to the potential of a reset line 326 in accordance with a signal from a control line 325. The amplifier 310 forms, for example, a source-follower circuit. In addition, as the first transfer switch 304 and the second transfer switch 305, for example, MOS transistors are used.

The operation of the first transfer switch 304 is controlled by a control signal supplied via a control line 321. A driving pulse represented by the signal waveform 205 in FIG. 2 is supplied from the control line 321 to the first transfer switch 304. The operation of the second transfer switch 305 is controlled by a control signal supplied via a control line 322. In this embodiment, the pixels 300 are arranged in a matrix, and a common control line is connected to the pixels 300 included in one row. The signal waveforms 206 to 208 shown in FIG. 2 are supplied from the control lines 322 in accordance with the respective rows.

In addition, each pixel 300 includes a discharge switch 318 corresponding to the reset unit 108 shown in FIG. 1. The discharge switch 318 discharges charges in the photodiode 301 to a power supply node 324 such as an overflow drain to reset the potential of the photodiode 301 based on the charges. The operation of the discharge switch 318 is controlled by a control signal supplied via a control line 323. A driving pulse represented by the signal waveform 204 shown in FIG. 2 is supplied from the control line 323 to the discharge switch 318. With these arrangements, each photodiode 301 can accumulate charges generated while the capacitor 302 temporarily holds charges. For this reason, the image capturing apparatus 101 has a function of matching the photoelectric conversion periods of a plurality of pixels 300 and a so-called global electronic shutter function. In addition, the discharge switches 318 simultaneously discharge charges accumulated in the photodiode 301 in a plurality of pixels 300. The above operation may be simultaneously performed in all the pixels. This operation is may be performed by at least a plurality of pixels two-dimensionally arranged in an array. The following description will exemplify a case in which all the pixels simultaneously perform the above operation.

In this embodiment, the start of exposure is controlled by controlling each discharge switch 318. More specifically, the discharge switch 318 is changed from the ON state to the OFF state to start the accumulation of charges in the photoelectric conversion unit 301. This makes it possible to freely set an exposure time. As described above, having the overflow drain structure and the capacitors 302 makes it possible to form a multiple-exposed short-time exposure image by transferring charges generated by short-time exposure to the capacitors 302 during one frame.

In addition, in this embodiment, each first transfer unit 109 or each reset unit 108 may have a function of thoroughly transferring all charges generated by the corresponding photoelectric conversion unit 107 to the charge holding unit 110 or resetting the charges. In addition, each second transfer unit 111 may have a function of thoroughly transferring charges from the corresponding charge holding unit 110 to the corresponding output unit 112. This can be implemented by manufacturing each element constituting the circuit of each pixel 300 shown in FIG. 3 upon properly setting the potential distribution of each element. Transferring or resetting all charges can suppress transfer irregularity or reset irregularity caused by heat. This suppresses the influence of thermal noise and can obtain a high image quality even after a plurality of sampling operations.

Figure 4:
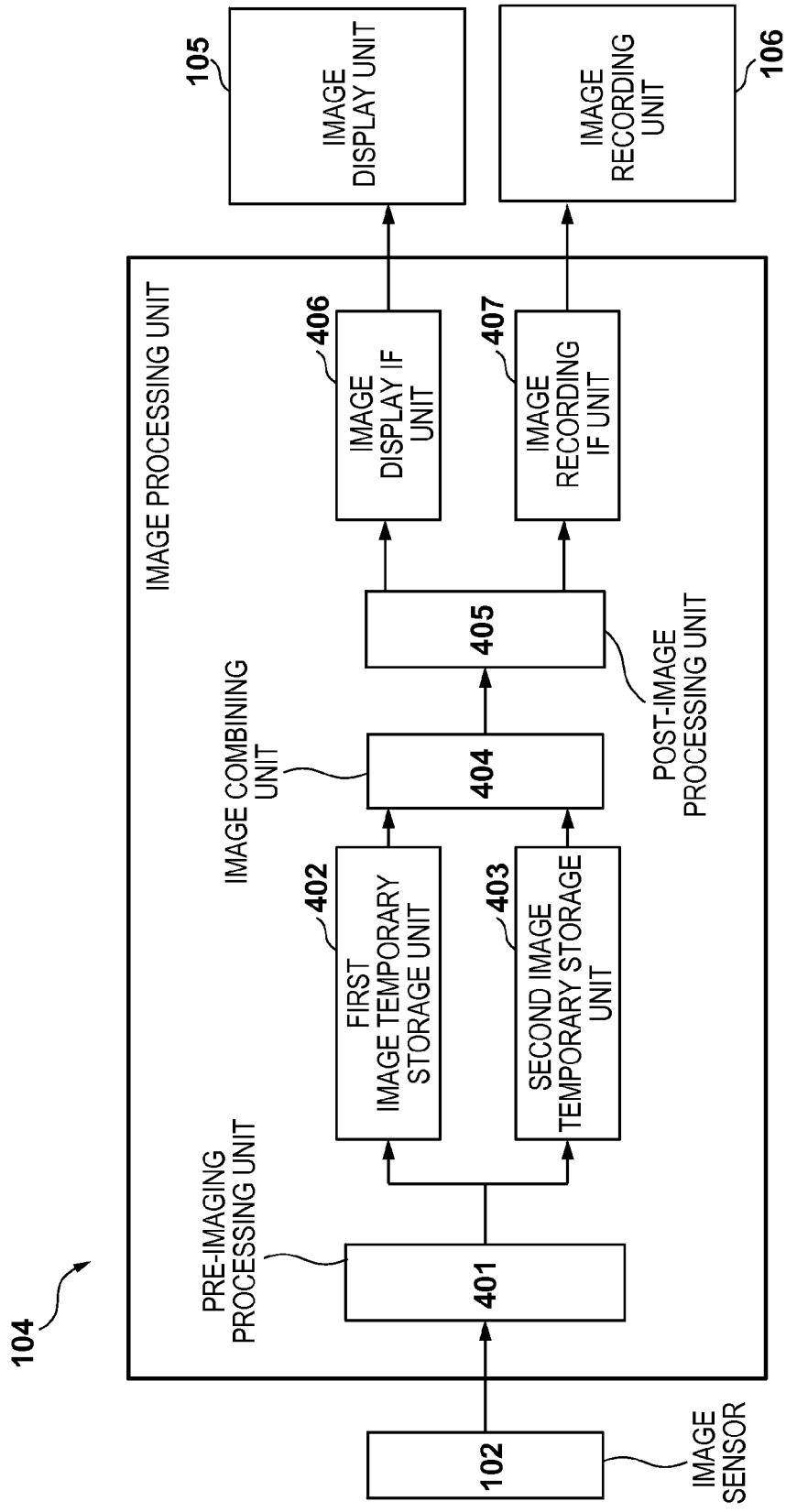
FIG. 4 is a block diagram showing the arrangement of an image processing unit of the image capturing apparatus in FIG. 1.
Figure 5:
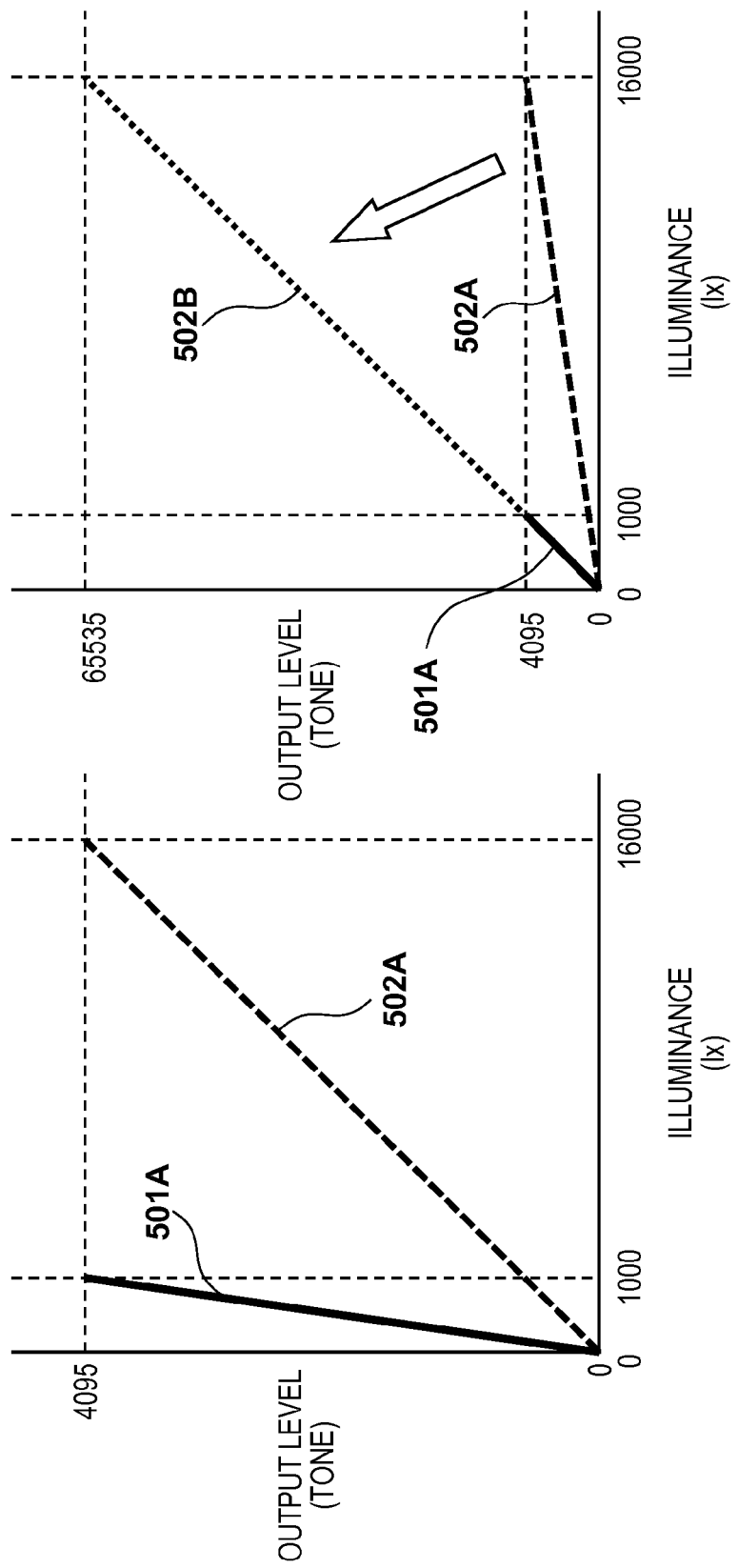
FIGS. 5A and 5B are graphs for explaining an image combining method for the image capturing apparatus in FIG. 1.

A combining method for images with different exposure times which are captured by the image sensor 102 will be described next with reference to FIGS. 4, 5A, and 5B. FIG. 4 shows an example of the arrangement of the image processing unit 104 of the image capturing apparatus 101 according to this embodiment. The image processing unit 104 receives image signals of the respective frames from the image sensor 102, combines two or more images with different exposure times, and outputs the resultant display signal to the image display unit 105 and the resultant recording signal to the image recording unit 106. A pre-imaging processing unit 401 performs image processing such as black level correction for image data input from the image sensor 102. A first image temporary storage unit 402 temporarily holds, in a frame memory or the like, multiple-exposed short-time exposure image data obtained by a plurality of short-time sampling operations during one frame. A second image temporary storage unit 403 temporarily holds, in a frame memory or the like, single long-time exposure image data obtained by a long-time sampling operation during one frame. An image combining unit 404 generates a composite image with an extended dynamic range by combining a multiple-exposed short-time exposure image input from the first image temporary storage unit 402 and a single long-time exposure image input from the second image temporary storage unit 403. A post-image processing unit 405 converts a pixel arrangement signal from the image sensor with a Bayer arrangement or the like into a general video signal such as an RGB signal or YCbCr signal. The post-image processing unit 405 may also perform image quality correction such as white balance correction or gamma correction for a composite image. An image display IF unit 406 is an IF unit which transmits an image display signal to the image display unit 105 and transmits/receives control signals. An image recording IF unit 407 is an IF unit which transmits an image recording signal to the image recording unit 106 and transmits/receives control signals.

FIGS. 5A and 5B show a dynamic range extended image generating method performed by the image combining unit 404 of the image capturing apparatus 101 according to this embodiment. The following shows a case in which the image combining unit 404 combines a multiple-exposed short-time exposure image and a long-time exposure image, increases, for example, the numbers of tone as the output level from 4,096 tones to 65,536 tones, and extends the dynamic range from 72 dB to 96 dB.

FIG. 5A is a graph showing the relationships between illuminance and output level of a short-time exposure image obtained by a plurality of short-time sampling operations and a long-time exposure image obtained by one long-time sampling operation before image combining. A characteristic 501A represents an output level corresponding to illuminance at the time of capturing a long-time exposure image, which is mainly used to capture a dark region of an object. Assume that in this case, the output of the image sensor is 12 bits, and the output number of tone is 4,096 tones. A characteristic 502A represents an output level corresponding to illuminance at the time of capturing a short-time exposure image, which is mainly used to capture a bright region of an object. The inclination of the characteristic of a short-time exposure time with a short exposure time is gentler than that of the characteristic of a long-time exposure time. For the sake of simplicity, assume that the exposure time of long-time exposure is 16 times a total exposure time of short-time exposure performed a plurality of times.

In this embodiment, the output level of a long-time exposure image at the time of image capturing is set to reach 4,095 tones when the illuminance is 1000 lx, whereas the output level of a short-time exposure image at the time of image capturing is set to reach 4,095 tones when the illuminance is 16000 lx, which is 16 times 1000 lx. First of all, in order to combine an image captured by long-time exposure and an image captured by short-time exposure, the image data captured by short-time exposure is digitally shifted to higher order by 4 bits to form an image. With this operation, the image data captured by short-time exposure is shifted to higher order by 4 bits to become 16-bit data with 65,536 tones. The long-time exposure image and the short-time exposure image are then combined. A 16-bit image is generated by using image data captured by long-time exposure at tone levels lower than a given threshold output level and using image data captured by short-time exposure at tone levels higher than the threshold output level. For example, the threshold is set to 4,095 tones. FIG. 5B shows the tone output level of a composite image with respect to illuminance. A characteristic 501A obtained by long-time exposure represents a region using, without change, data with output levels equal to or lower than 4,095 tones as the threshold. A characteristic 502B represents a region, of the data obtained by shifting the characteristic 502A of the data of the short-time exposure image to higher order by 4 bits, which has output levels higher than 4,095 tones as the threshold. With this operation, the composite image becomes an image with an extended dynamic range with a saturation level 16 times higher than that of image capturing for a dark portion while having a tone accuracy of 16 bits in the dark portion. In this embodiment, the exposure time of long-time exposure is 16 times the sum of exposure times of short-time exposure performed a plurality of times. However, it is possible to obtain an image having a high dynamic range equal to or more than 100 dB by setting a higher exposure time ratio.

Using the above arrangement and driving method allows the image capturing apparatus 101 to suppress, for example, the possibility of falsely detecting the ON state of a bright traffic signal machine designed to perform short-time exposure when capturing the ON state of the bright traffic signal machine outside a dark tunnel by using a vehicle-mounted camera of a vehicle running in the tunnel. In addition, combining a short-time exposure image and a long-time exposure image enables the image capturing apparatus 101 to obtain an image with a wide dynamic range, clearly depicting a dark portion inside the tunnel as well as a bright portion outside the tunnel.

In this manner, an image capturing apparatus is implemented, which has improved detection accuracy of the ON and OFF states of a light source designed to blink in a short cycle when performing image capturing in an environment requiring a wide dynamic range, in which dark and bright portions coexist. In addition, an image capturing apparatus is implemented, which acquires a moving image with high image quality by suppressing flicker caused by exposure amount fluctuations due to light source blinking. The image capturing apparatus 101 according to this embodiment does not require any ON detection unit for detecting light source blinking like that disclosed in Japanese Patent Laid-Open No. 2007-6049. In addition, there is no need to match the blinking phase of a light source with the exposure operation of a sensor. This simplifies the circuit arrangement. As a consequence, a low-cost image capturing apparatus is implemented.

Figure 6:
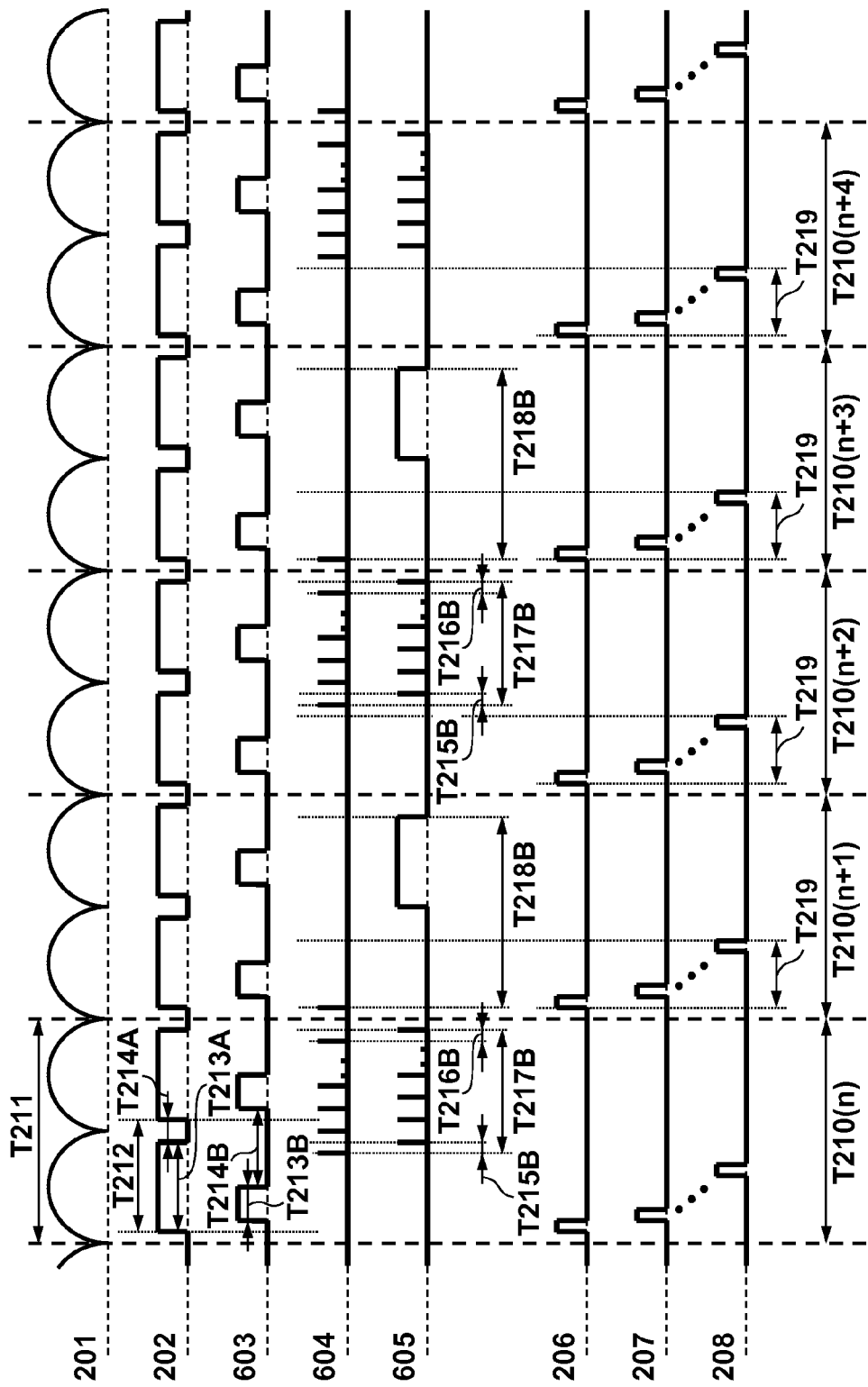
FIG. 6 is a timing chart for explaining the operation of an image capturing apparatus according to a second embodiment of the present invention.

A driving method for an image capturing apparatus according to a second embodiment of the present invention will be described with reference to FIG. 6. FIG. 6 is a timing chart for explaining the operation of an image capturing apparatus 101 according to this embodiment. As compared with the timing chart of FIG. 2 for the first embodiment, the second embodiment differs from the first embodiment in that it uses signal waveforms 604 and 605 in place of the signal waveforms 204 and 205 of the signal waveforms 204 to 208 from the control unit 103 to the image sensor 102. The second embodiment may be the same as the first embodiment in other respects. In addition, the arrangement of the image capturing apparatus according to the second embodiment may be the same as that of the image capturing apparatus 101 according to the first embodiment. For this reason, a repetitive description of similar constituent elements will be omitted.

The first embodiment described above has exemplified the traffic signal machine or the like using the LED light source designed to perform display by blinking at a frequency twice that of commercial power supply, in which the ON time of the light source is long. Meanwhile, in a light source such as an illumination which performs brightness control by blinking driving or a display using such a light source, when the luminance is decreased, the ratio of an ON period to the blinking cycle of the light source may become less than ½. When performing image capturing of such a light source, sampling operations with short-time exposure times for dynamic range extension may cause flicker on the light source or display. A driving method for the image capturing apparatus according to this embodiment, which suppresses this flicker, will therefore be described below.

In the timing chart of FIG. 6, a waveform 201 schematically indicates a waveform obtained by full-wave rectification of AC power supply. A waveform 202 indicates the ON state of an LED light source which uses power supply with the waveform 201 and performs brightness control by, for example, blinking driving. A waveform 603 indicates a case in which the luminance of the light source which performs brightness control by blinking driving is decreased lower than that of the waveform 202.

The signal waveform 604 of a pulse signal supplied from the control unit 103 to the image sensor 102 indicates the waveform of a reset signal for resetting the potential of each photoelectric conversion unit 107, which is sent from a sampling operation switching unit 113 to a reset unit 108 like the signal waveform 204 in FIG. 2. The signal waveform 605 of a pulse signal supplied from the control unit 103 to the image sensor 102 indicates the waveform of a transfer signal sent from the sampling operation switching unit 113 to each first transfer unit 109 like the signal waveform 205 in FIG. 2.

A period T215B indicates the period of the first sampling operation of short-time sampling operations in a frame. In addition, a period T216B indicates the period of the last sampling operation of short-time sampling operations in a frame. Furthermore, a period T217B indicates the period from the start of the first sampling operation to the end of the last sampling operation of short-time sampling operations performed plurality of times in one frame. In this embodiment, in order to perform image formation within the same frame, a plurality of short-time sampling operations are performed from the period T215B to the period T216B in the period T217B. Charges generated in the period of a plurality of sampling operations from the period T215B to the period T216B are transferred to each charge holding unit 110 to be added, thereby forming a multiple-exposure image with short exposure times.

A period T218 indicates the period of a long-time sampling operation. Charges generated during the period T218 are sampled, and each charge holding unit 110 forms a single-exposure image with a long exposure time.

An operation based on the signal waveforms 206 to 208, that is, transferring a captured image from each second transfer unit 111 to a corresponding output unit 112, is the same as that described in the first embodiment. Charges sampled at the nth frame are sequentially transferred to each output unit 112 for each row at the (n+1)th frame, thereby forming a frame image corresponding to one screen. In addition, the following operation may be the same as that in the first embodiment: forming an image with an extended dynamic range by combining images with different exposure times for each frame, which are transferred from each output unit 112 to an image processing unit 104, displaying the image on an image display unit 105, and recording the image on an image recording unit 106.

Assume that in this embodiment, the interval between a plurality of short-time sampling operations performed from the period T215B to the period T216B is ½ or less a period T212 which is the blinking cycle of the light source. In other words, the interval between short-time sampling operations is set to ¼ or less the period of one frame. In the embodiment, since sampling is performed m times during the period T212 which is the blinking cycle of the light source, sampling is performed at intervals of 1/m (m≥2) the period T212 which is the blinking cycle of the light source. In addition, the period T217B is set to be equal to ½ a period T211, that is, the period T212 which is the blinking cycle of the light source. That is, the period T217B is set to ½ the period of one frame.

If the ON time of the light source is short like a period T213B of the waveform 603, an ON state can be detected as long as the sampling interval is ½ or less the period T213B which is the ON time of the light source. This makes it possible to suppress luminance fluctuation differences among short-time exposure images and suppress flicker caused by the blinking operation of the light source, thereby acquiring a high-quality moving image with an extended dynamic range.

This embodiment also obviates the necessity to match the relationship between the blinking phase of the light source and the phase of short-time exposure, and hence the image capturing apparatus requires no ON detection unit which detects the blinking of the light source. In addition, there is no need to perform an operation for matching the blinking phase of the light source with the phase of exposure. This simplifies the circuit arrangement. As a consequence, a low-cost image capturing apparatus is implemented.

In this case, it is necessary to match, to some extent, the relationship between the period T212, which is the blinking cycle of the light source, and the period of a frame in the image capturing apparatus. Consider a case in which the blinking cycle of a light source is ½ the cycle of commercial power supply, like a display apparatus such as a traffic signal machine, electric bulletin board, or display. The frequency of commercial power supply is 50 Hz in some areas, and 60 Hz in other areas. For this reason, determining an area based on GPS information or map information, which has recently been frequently used, obviates the necessity to detect the blinking cycle of a light source. In addition, this embodiment exemplifies the chart on which the blinking cycle of the light source is synchronized with the period of each frame in the image capturing apparatus. However, it is not necessary to strictly match the cycle with the period because no large luminance fluctuations occur as long as they are approximately matched with each other.

In addition, using this embodiment can acquire a moving image with suppressed fluctuations and irregularity because sampling is performed a plurality times even with the use of, for example, a light source whose luminance cyclically changes in an analog manner instead of a light source exhibiting digital waveforms like the waveforms 202 and 603. This is because even with the use of a light source whose luminance greatly changes, an average image is obtained by sampling performed a plurality of times. Furthermore, even with the use of a light source exhibiting no cyclical change, an image capturing apparatus which acquires a high-quality moving image can be implemented.

Figure 7:
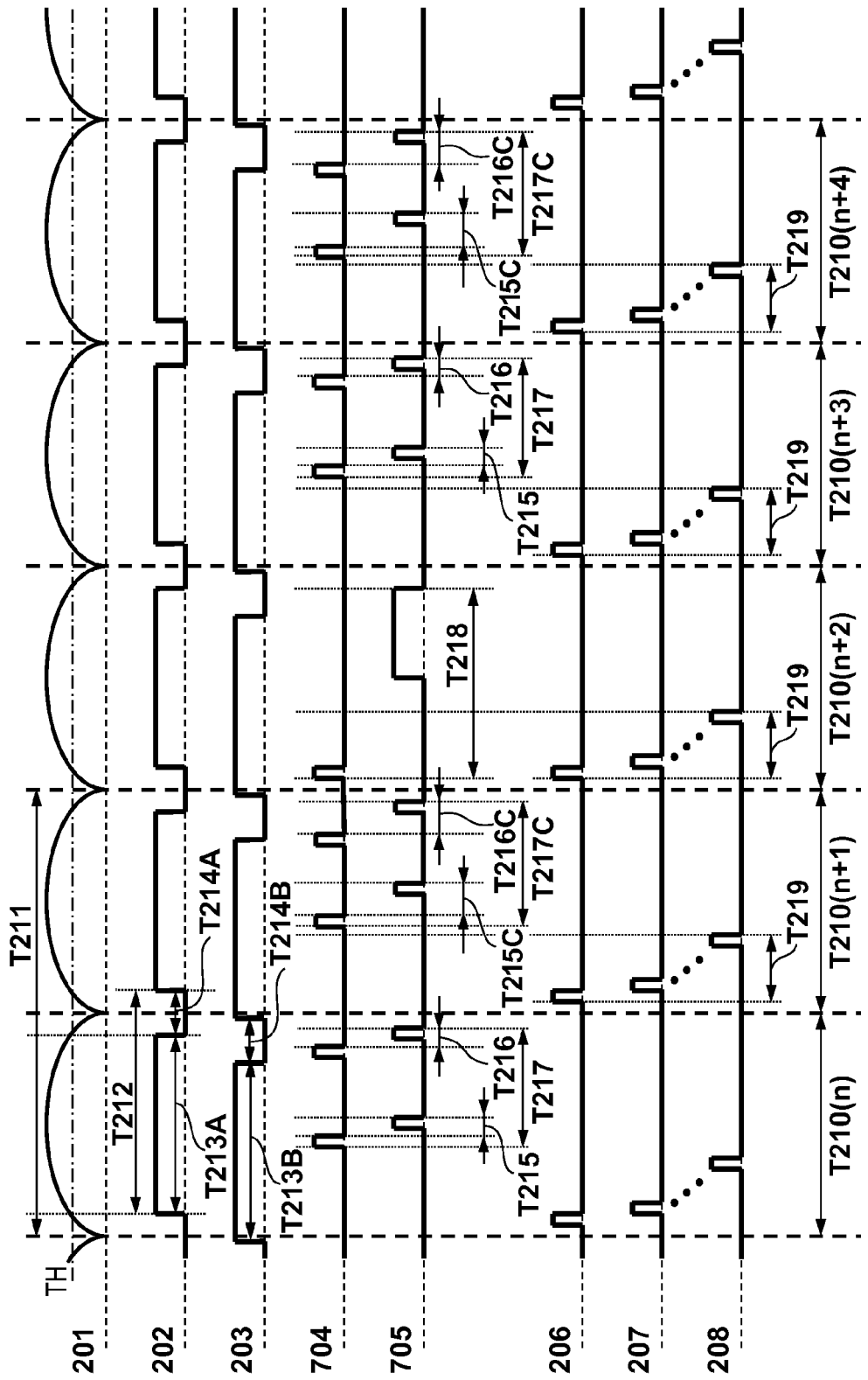
FIG. 7 is a timing chart for explaining the operation of an image capturing apparatus according to a third embodiment of the present invention.

A driving method for an image capturing apparatus according to a third embodiment of the present invention will be described with reference to FIG. 7. FIG. 7 is a timing chart for explaining the operation of an image capturing apparatus 101 according to this embodiment. As compared with the timing chart of FIG. 2 for the first embodiment, the third embodiment differs from the first embodiment in that it uses signal waveforms 704 and 705 in place of the signal waveforms 204 and 205 of the signal waveforms 204 to 208 from the control unit 103 to the image sensor 102. The third embodiment may be the same as the first embodiment in other respects. The arrangement of the image capturing apparatus according to the third embodiment may be the same as that of the image capturing apparatus 101 according to the first embodiment. For this reason, a repetitive description of similar constituent elements will be omitted.

The first embodiment described above has exemplified the case in which two images obtained under different exposure conditions, that is, a multiple-exposure image obtained by short-time exposure and a single-exposure image obtained by long-time exposure, are alternately output for each frame, and the images are combined to output an image with an extended dynamic range. Meanwhile, the present invention is not limited to image combining of combining one short-time exposure image obtained by multiply exposure and one long-time exposure image obtained by single exposure. When performing actual dynamic range extension, the ratio between exposure times is sometimes set to as high as 100 or more. In such a case, since the difference in luminance range for image capturing between a short-time exposure image and a long-time exposure image is large, the linearity of the composite image sometimes deteriorates. In addition, since the boundary luminance errors at luminance levels near a threshold for combining are large, for example, image quality is deteriorated by pseudo contours or the like. In order to suppress such a deterioration in image quality, images acquired with three or more different exposure times may be combined to improve image quality as compared with an image obtained by combining images acquired under two different conditions. A driving method for the image capturing apparatus according to this embodiment will therefore be described below.

Referring to the timing chart of FIG. 7, a waveform 201 schematically indicates a waveform obtained by full-wave rectification of AC power supply. A waveform 202 indicates the ON state of an LED light source using power supply represented by the waveform 201, such as a traffic signal machine.

Like the signal waveform 204 in FIG. 2, the signal waveform 704 of a pulse signal supplied from the control unit 103 to the image sensor 102 indicates the waveform of a reset signal which is sent from a sampling operation switching unit 113 to each reset unit 108 to reset the potential of a corresponding photoelectric conversion unit 107. Like the signal waveform 205 in FIG. 2, the signal waveform 705 of a pulse signal supplied from the control unit 103 to the image sensor 102 indicates the waveform of a transfer signal sent from the sampling operation switching unit 113 to each first transfer unit 109.

Periods T215 and T216 respectively indicate periods during which short-time sampling operations are performed. In addition, periods T215C and T216C respectively indicate periods during which third sampling operations are performed. The third sampling operations in the periods T215C and T216C each have a third exposure time. The third exposure time is set to be longer than the exposure time of each of short-time sampling operations in the periods T215 and T216. In addition, the third exposure time is set to be shorter than the exposure time of a long-time sampling operation in a period T218.

Periods T217 and T217C respectively indicate periods from the starts of the first sampling operation to the ends of the last sampling operations of a plurality of short-time sampling operations in one frame and the first sampling operation to the ends of the last sampling operations of the third sampling operations in one frame. In this embodiment, two short-time sampling operations are performed in the periods T215 and T216 during the period T217. In addition, the two third sampling operations are performed in the periods T215C and T216C during the period T217C. Charges generated during the periods of these sampling operations are sampled and transferred to each charge holding unit 110 to be added, thereby forming multiple-exposure images with two types of short-time exposure including exposure by a short-time sampling operation and exposure by the third sampling operation. A period T218 indicates the period of a long-time sampling operation. Charges generated during the period T218 are sampled to form a single-exposure image with long-time exposure in each charge holding unit 110.

In this case, a first pulse generation unit 114 may generate a pulse signal for causing the image sensor 102 to perform the third holding operation of performing the third sampling operation a plurality of times. In this case, the first pulse generation unit 114 may sequentially switch between generating a pulse signal for the execution of the first holding operation and generating a pulse signal for the execution of the third holding operation for each frame. Furthermore, the control unit 103 may further include the third pulse generation unit for generating a pulse signal for the execution of the third holding operation, and may cause the sampling operation switching unit 113 to sequentially switch pulse signals to be transmitted to the image sensor 102 for each frame.

Charges held by a plurality of short-time sampling operations in the period T217 at the nth frame indicated by a period T210(*n*) are output as an exposure image corresponding to one frame during a period T219 in a period T210(*n*+1) at the (n+1)th frame. Likewise, charges held by a plurality of third sampling operations in the period T217C at the (n+1)th frame indicated by the period T210(*n*+1) are output during the period T219 in a period T210(*n*+2) at the (n+2)th frame. In addition, charges held by one long-time sampling operation during the period T218 at the (n+2)th frame indicated by the period T210(*n*+2) are output as an exposure image corresponding to one frame during the period T219 in a period T210(*n*+3) at the (n+3)th frame. In this embodiment, the image sensor 102 outputs a multiple-exposure image obtained by short-time exposure by short-time sampling operations, a multiple-exposure image obtained by exposure by the third sampling operations, and a single-exposure image obtained by long-time exposure by a long-time sampling operation in a three-frame cycle.

An image processing unit 104 combines images with three different exposure times into one image with an extended dynamic range. Assume that the ratios among the sum of exposure times of a plurality of short-time sampling operations, the sum of exposure times of a plurality of third sampling operations, and the exposure time of a single long-time sampling operation are 1:10:100. If combining two types of images including an image obtained by short-time sampling operations and an image obtained by a long-time sampling operation, the images to be combined differ in range by 100 times. In this embodiment, however, using the third sampling operations makes it possible to suppress the differences in range between them to 10 times each, thereby suppressing deterioration in image quality. This makes it possible to acquire a high-quality image with an extended dynamic range as compared with a case in which images with two different exposure times are combined. In addition, an image capturing apparatus is implemented, which further extends a dynamic range when image quality remains almost the same.

As in this embodiment, when implementing an image capturing apparatus having a dynamic range extension function, it is possible to suppress the trouble of failing to detect a blinking light source because of an increase in the number of types of sampling cycles for image capturing when acquiring images with short exposure times. In addition, this arrangement reduces the necessity to match the relationship between the blinking phase of the light source and the phase of short-time exposure, and hence requires no ON detection unit which detects the blinking of the light source. In addition, there is no need to match the blinking phase of the light source with the phase of exposure operation performed by the image capturing apparatus. This simplifies the circuit arrangement. As a consequence, a low-cost image capturing apparatus is implemented.

Figure 8:
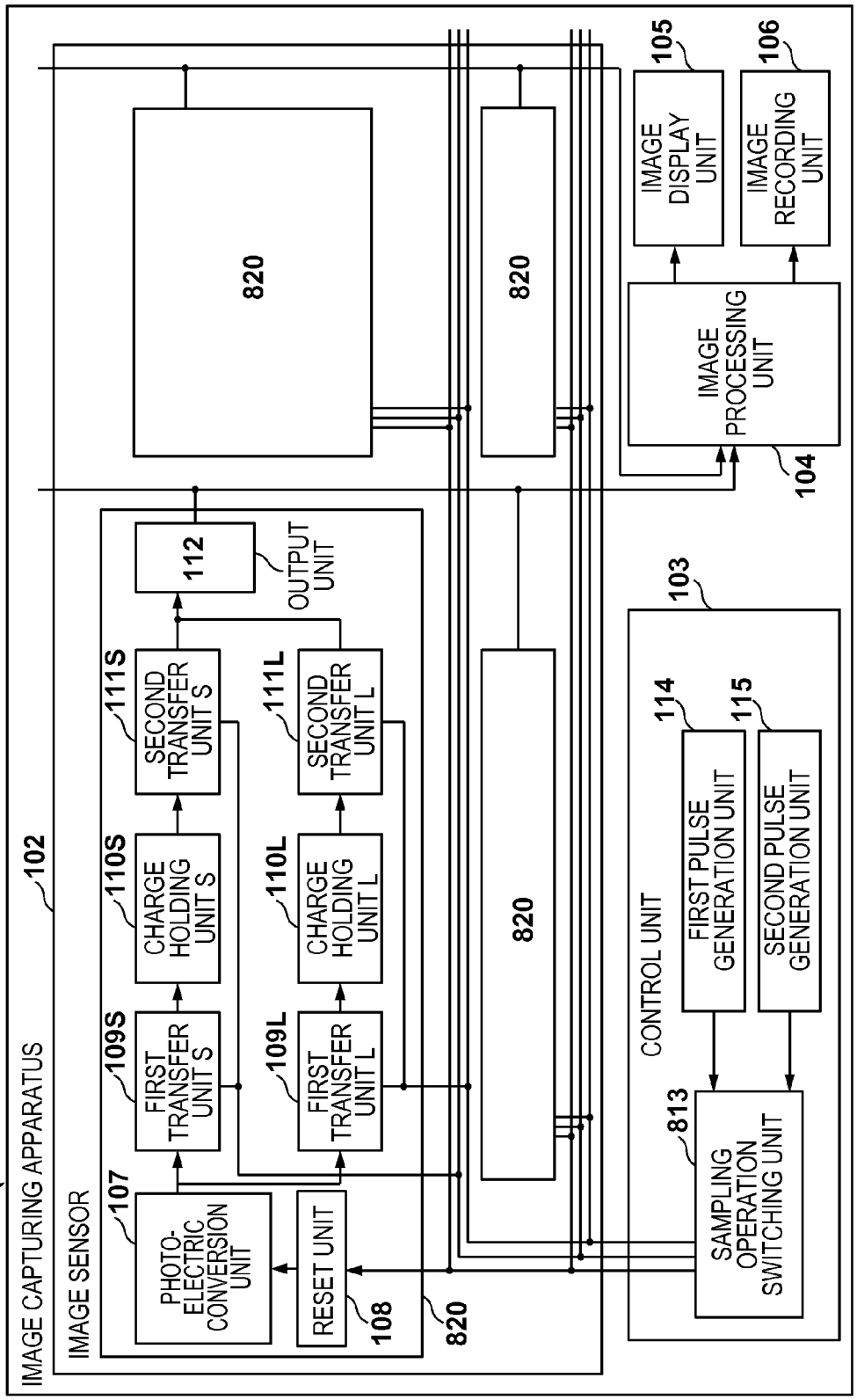
FIG. 8 is a block diagram of an image capturing apparatus according to a fourth embodiment of the present invention.

The structure of an image capturing apparatus and a driving method for the image capturing apparatus according to an embodiment of the present invention will be described with reference to FIGS. 8 to 10. FIG. 8 is a block diagram schematically showing an example of the arrangement of an image capturing apparatus 801 according to a fourth embodiment of the present invention. Unlike the image capturing apparatus 101 shown in FIG. 1, an image sensor 102 has an array of pixels 820 each having two sets each including a charge holding unit 110, a first transfer unit 109, and a second transfer unit 111. In addition, the sampling operation switching unit 113 is changed to a sampling operation control unit 813 which supplies a pulse signal for driving the image sensor 102. Other constituent elements of the image capturing apparatus 801 may be the same as those of the image capturing apparatus 101 described above. In this specification, when it is necessary to discriminate the respective constituent elements included in each set, the reference numerals of the respective constituent elements are provided with the suffixes "S" and "L" (for example, the charge holding unit 110S).

Figure 9:
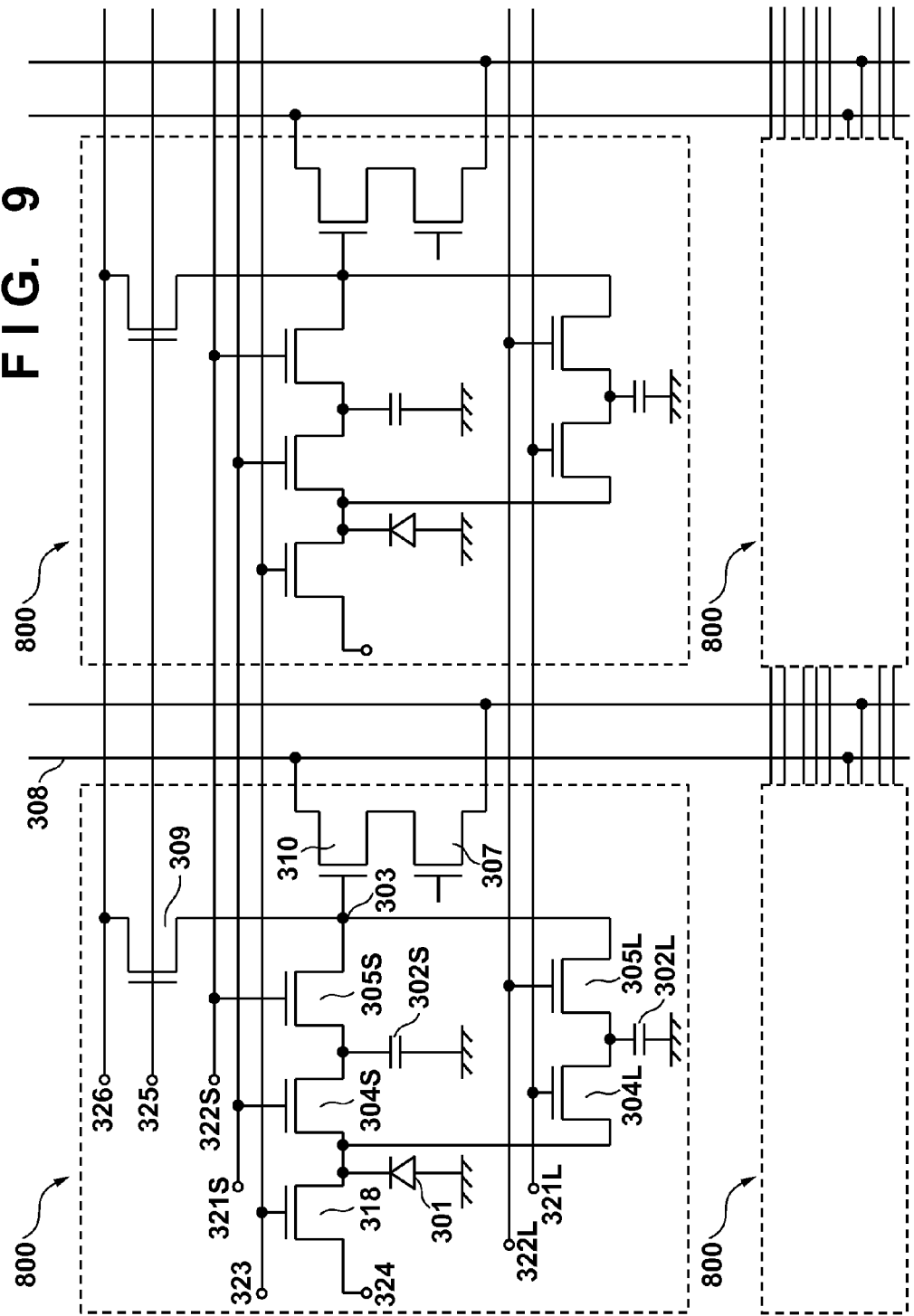
FIG. 9 is an equivalent circuit diagram of a pixel portion of the image capturing apparatus in FIG. 8.

FIG. 9 shows an example of the arrangement of an equivalent circuit of a pixel portion of the image sensor 102 of the image capturing apparatus 801 according to this embodiment. A pixel 800 corresponds to the pixel 820 in FIG. 8. Unlike the pixel 300 shown in FIG. 3, the pixel 800 includes two sets each including a capacitor 302, a first transfer switch 304, and a second transfer switch 305. In addition, the pixel 800 includes control lines 321S and 321L for respectively controlling first transfer switches 304S and 304L and control lines 322S and 322L for respectively controlling second transfer switches 305S and 305L. Other constituent elements of the pixel 800 may be the same as those of the pixel 300 described above. With this arrangement, while charges are held in one capacitor, charges are transferred from a photodiode 301 to the other capacitor to be held (a first step). While charges are held in the two charge holding units in the first step, charges are transferred from one charge holding unit to an output unit (a second step). Performing sequentially this operation allows the two charge holding units to hold signals with high simultaneity. This operation will be described in detail below.

In each pixel 800, charges generated by a photodiode 301 are respectively held in a capacitor 302S and a capacitor 302L in accordance with the times respectively selected by the first transfer switch 304S and the first transfer switch 304L. In the first to third embodiments, the control unit 103 causes the image sensor 102 to perform sampling operations with different exposure times for each frame, thereby sequentially generating images with the different exposure times for each frame. In contrast to this, in this embodiment, since each pixel 800 includes a plurality of charge holding units 110, the control unit 103 causes the image sensor 102 to concurrently perform sampling operations with different exposure times and generate a plurality of signals obtained with the different exposure times for each frame.

Figure 10:
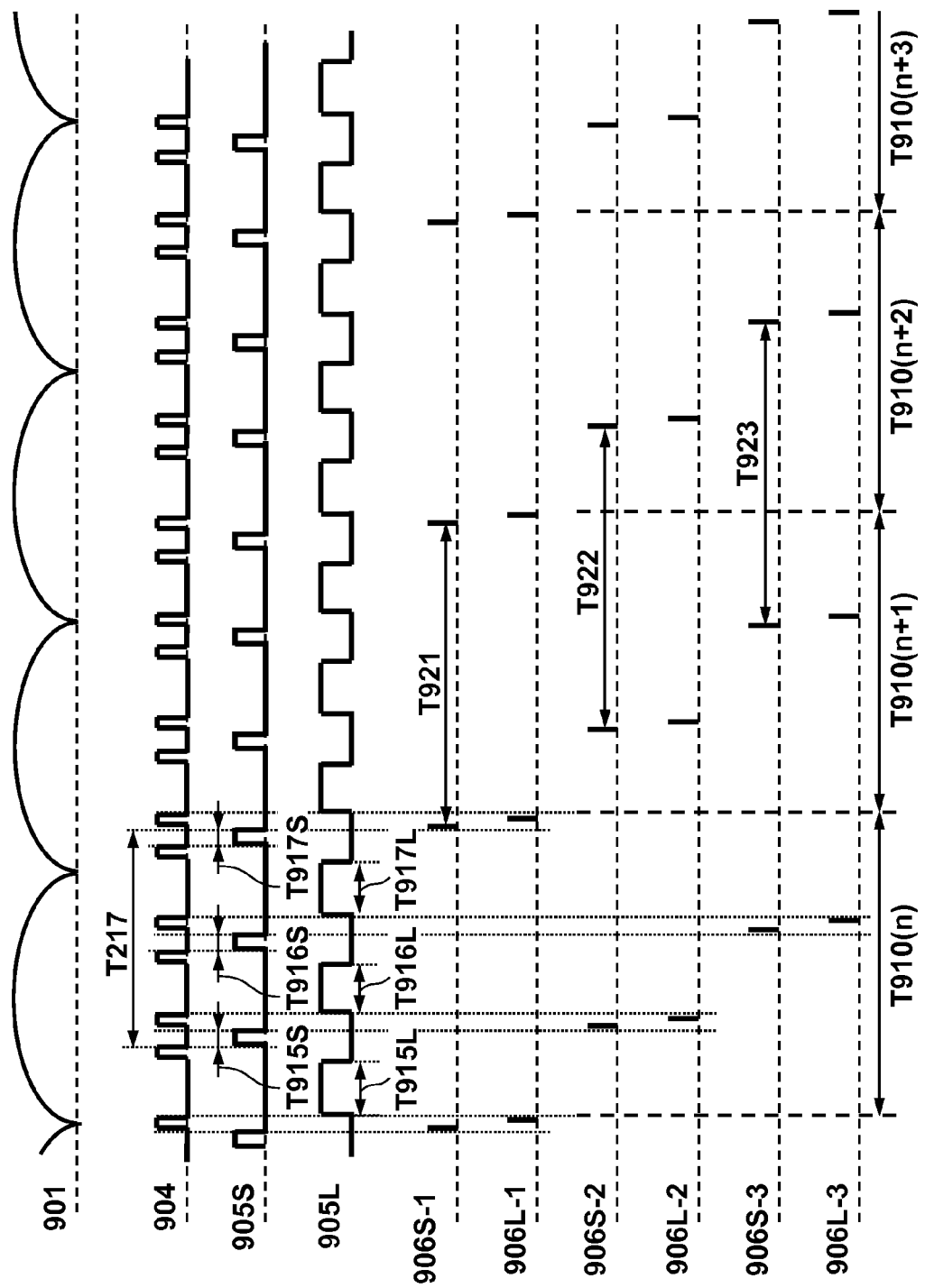
FIG. 10 is a timing chart for explaining the operation of the image capturing apparatus in FIG. 8.

FIG. 10 is a timing chart for explaining the operation of the image capturing apparatus 801 according to this embodiment. Periods T910($n$), T910($n$+1), T910($n$+2), and T910($n$+3) respectively indicate the frame periods of the nth, (n+1)th, (n+2)th, and (n+3)th frames. In this embodiment, at each frame, since each pixel 820 has two charge holding units, the image sensor 102 outputs two signals with different exposure times to an image processing unit 104. The image processing unit 104 generates an image by combining two signals with different exposure times which are output for each frame. In the embodiment, each pixel 820 includes two sets each including the charge holding unit 110, the first transfer unit 109, and the second transfer unit 111. For example, each pixel may include three or more sets and generate three or more images with different exposure times for each frame.

A waveform 901 indicates the ON waveform of an analog-modulated LED light source or the like used for, for example, display on electric bulletin boards, various types of illumination devices, and vehicles. A signal waveform 904 indicates the waveform of a pulse signal which is output from the sampling operation control unit 813 to each reset unit 108 to reset the potential of a photoelectric conversion unit 107. As in the above embodiments, "H" level and "L" level respectively indicate a reset state and a non-reset state. The photoelectric conversion units 107 of all the pixels 820 arranged in an array on the image sensor 102 are collectively and simultaneously reset. For this purpose, reset signals, each with "H" level of the signal waveform 904, are input to reset units 108 of all the pixels 820 at the same timing.

A signal waveform 905S indicates the waveform of a pulse signal output from the sampling operation control unit 813 to each first transfer unit 109S. A signal waveform 905L indicates the waveform of a pulse signal output from the sampling operation control unit 813 to each first transfer unit 109L. In this embodiment, charges generated by the photoelectric conversion units 107 are simultaneously transferred to charge holding units 110S or 110L in all the pixels 820 arranged in an array. When the signal waveform 905S is set at "H" level, charges generated by each photoelectric conversion unit 107 are transferred to the corresponding charge holding unit 110S. At this time, transfer signals, each with "H" level of the signal waveform 905S, are simultaneously input to the first transfer units 109S of all the pixels 820. Likewise, when the signal waveform 905L is set at "H" level, charges generated by each photoelectric conversion unit 107 are transferred to the corresponding charge holding unit 110L. At this time, transfer signals, each with "H" level of the signal waveform 905L, are simultaneously input to the first transfer units 109L of all the pixels 820. With this operation, the two charge holding units 110S and 110L respectively sample charges generated by the photoelectric conversion unit 107 with different exposure times respectively defined by the signal waveform 904, the signal waveform 905S, the signal waveform 904, and the signal waveform 905L. These charge holding units may sample charges with the same exposure time and different numbers of times of sampling.

In this case, periods T915S, T916S, and T917S respectively indicate periods of short-time sampling operations for transferring charges accumulated in each photoelectric conversion unit 107 to the corresponding charge holding unit 110S in response to a driving pulse with the signal waveform 905S after resetting by a driving pulse with the signal waveform 904. Likewise, periods T915L, T916L, and T917L respectively indicate periods of long-time sampling operations for transferring charges accumulated in the photoelectric conversion unit 107 to the charge holding unit 110L in response to a driving pulse with the signal waveform 905L after resetting by a driving pulse with the signal waveform 904. Short-time sampling operations in the periods T915S, T916S, and T917S and long-time sampling operations in the period T915L, T916L, and T917L are not simultaneously performed but sequentially performed. The control unit 103 can concurrently generate images with different exposure times during the period of the same frame by causing the image sensor 102 to sequentially perform short-time sampling operations and long-time sampling operations. Alternatively, the control unit 103 can concurrently generate images with high simultaneity even though they are obtained at different sampling timings.

Signal waveforms 906S and 906L indicate the waveforms of pulse signals which are output from the sampling operation control unit 813 to second transfer units 111S and 111L to sequentially transfer charges temporarily held in the charge holding units 110S and 110L to each output unit 112. When the signal waveforms 906S and 906L are at "H" level, the second transfer units 111S and 111L in the corresponding pixel 820 are turned on to sequentially transfer charges temporarily held in the charge holding units 110S and 110L to the output unit 112. Signal waveforms 906S-1, 906S-2, and 906S-3 respectively indicate the waveforms of pulse signals used to transfer charges accumulated in the charge holding unit 110S during the periods T917S, T915S, and T916S. Likewise, signal waveforms 906L-1, 906L-2, and 906L-3 respectively indicate the waveforms of pulse signals used to transfer charges accumulated in the charge holding unit 110L during the periods T917L, T915L, and T916L. In addition, a period T910 is a transfer period corresponding to one screen, during which image data corresponding to one frame from the first row to the last row are sequentially output to the output unit 112 for each row in accordance with the signal waveforms 906S-1 and 906L-1 to signal waveforms 906S-3 and 906L-3. The period T910 can be regarded as the period of one frame.

In this embodiment, during the period T910 of one frame, three short-time sampling operations indicated by the periods T915S, T916S, and T917S are performed to generate a multiple-exposure image with short exposure times. In addition, during the period T910 of one frame, three long-time sampling operations indicated by the periods T915L, T916L, and T917L, which are longer than those of short-time sampling operations, are performed to generate a multiple-exposure image with long exposure times. The total time of the periods of a plurality of short-time sampling operations and a plurality of long-time sampling operations in a period of one frame is equal to the exposure times of images obtained by the respective sampling operations in a period of one frame.

In the first to third embodiments, images are sequentially generated with different exposure times for each frame, and images corresponding to a plurality of frames are combined to acquire a composite image with an extended dynamic range. In contrast to this, this embodiment is provided with the two charge holding units, that is, the charge holding units 110S and 110L, and is configured to input proper pulses to the respective transfer units to make it possible to generate images with two different exposure times within the same frame. Sufficiently increasing the numbers of sampling operations with different exposure times will shorten the time from the start of each sampling operation to the end. The change amounts of information obtained in this case are small between adjacent sampling operations with different exposure times, and hence two pieces of information obtained by the sampling operations can be equivalent to information continuously accumulated from the start of exposure to the end of exposure, even though the exposure periods differ from each other. For example, information on the first row is obtained in nearly a period T921, information on the second row is obtained in nearly a period T922, and information on the last row is obtained in nearly a period T923. That is, the embodiment can obtain pieces of image information with different exposure times at almost the same time.

In this manner, charges generated by the photoelectric conversion units 107 of the pixels 820 arranged in an array on the image sensor 102 are held in the two charge holding units 110 per pixel with different sampling times at the same time in all the pixels. Thereafter, each charge holding unit 110 outputs charges to the corresponding output unit 112 for each row, thereby outputting a multiple-exposure image obtained by adding charges sampled with different exposure times in a frame period corresponding to one screen. In this embodiment, an image obtained from charges held in each charge holding unit 110S is a multiple-exposure image with a short exposure time, and an image obtained from charges held in each charge holding unit 110L is a multiple-exposure image with a long exposure time.

Two multiple-exposure images with different exposure times are images obtained by a plurality of times of sampling at a time interval, and hence are pieces of information in the period of one frame instead of fixed values at a given moment when the ON state of the light source fluctuates. It is therefore possible to suppress flicker or the like caused at the time of image capturing of the light source. In addition, even if flicker cannot be completely suppressed, since the occurrence state of flicker in a screen remains similar between a short-time exposure image and a long-time exposure image, it is possible to suppress deterioration in image quality caused by the difference in the occurrence state of flicker when combining the respective multiple-exposure images. Furthermore, multiple-exposure images each are obtained by performing sampling a plurality of times in the period of the same frame, and hence are images captured with two different exposure times at almost the same time. Therefore, combining the respective readout multiple-exposure images can obtain an image with an extended dynamic range. In addition, since the respective multiple-exposure images have simultaneity, it is possible to suppress the occurrence of image shift caused by the movement of an object or camera, as compared with the above case in which images in different frames are combined.

In this embodiment, the control unit 103 causes each pixel 820 to perform a short-time sampling operation and a long-time sampling operation three times each with respect to information in the corresponding photoelectric conversion unit 107 in the period of one frame. However, the number of times of sampling is not limited to this. Since a flicker suppressing effect can be obtained by performing a sampling operation two or more times, the number of times of each type of sampling operation may be, for example, two. Alternatively, each type of sampling operation may be performed four or more times. For example, the number of times of short-time sampling in the period of one frame may differ from that of long-time sampling.

When increasing the number of times of a sampling operation in the period of one frame, acquired information can have the same effect as that obtained by continuous accumulation in the period of each frame. This improves the detection accuracy of, for example, a blinking light source and can suppress image fluctuations caused by the blinking of the detected light source and suppress flicker. Although it is noticeable when capturing a moving image, the amount of blur in a short-time exposure image is equal to that in a long-time exposure image because they are captured within the same frame, and hence a feeling of strangeness caused by a composite image is suppressed. For example, if capturing an image of a vehicle running in the night, it is possible to suppress troubles, for example, light not being blurred in spite of the fact that the body is blurred and the blur of the light appearing like dotted lines.

As described above, as the numbers of times of sampling operations increase, in other words, the pulse intervals of the signal waveforms 905S and 905L decrease, the flicker suppressing effect increases. Letting N(Hz) be the blinking frequency of a light source, a flicker suppressing effect appears when sampling cycle (Hz)>N(Hz). In addition, a sufficient effect appears under the condition of sampling cycle (Hz)>2N. For example, when image capturing is performed at 100 Hz under the illumination of a fluorescent light using 50-Hz commercial power supply, flicker tends to appear. In this case, an effect appears when sampling cycle (Hz)>100 Hz. In addition, a sufficient effect can be obtained when sampling cycle (Hz)>200 Hz. If using a light source using 50-Hz commercial power supply, a flicker suppressing effect can be obtained by decreasing the pulse intervals of the signal waveforms 905S and 905L to 10 ms or less. In addition, in order to increase the flicker suppressing effect, the pulse intervals of the signal waveforms 905S and 905L may be shorter than, for example, 5 ms.

In addition, the total time of exposure times for charge multiplexing may be increased to increase the flicker suppressing effect. For example, the time obtained by adding the sum of exposure times of short-time sampling operations and the sum of exposure times of long-time sampling operations may be ½ or more the blinking cycle of a light source.

In this embodiment, an image capturing apparatus is implemented, in which when there is a light source which blinks in a short cycle in an environment requiring a wide dynamic range, the detection accuracy of ON and OFF states of the light source is improved. In addition, an image capturing apparatus is implemented, which acquires a high-quality moving image by suppressing flicker caused by exposure amount fluctuations due to the blinking of a light source. In addition, the arrangement of the embodiment can form a wide dynamic range by acquiring a plurality of images with different exposure times for each frame and combining the obtained images. This can suppress temporal image shifts caused by the movement of the camera and the movement of the object and differences in flicker caused by a light source between a plurality of images as compared with the case in which a plurality of images with different exposure amounts are acquired for each frame and combined. In addition, as in each embodiment described above, there is no need to use any ON detection unit which detects the blinking of a light source, and it is not necessary to match the blinking phase of the light source with the exposure operation of the sensor. This simplifies the circuit arrangement and implements a low-cost image capturing apparatus.

Although the four embodiments according to the present invention have been described, the present invention is not limited to them. The respective embodiments described above can be changed and combined, as needed. For example, in the first to third embodiments, image capturing may be performed while switching, on a frame basis, between a frame in which three or more sampling operations with two or more types of short-time exposures are performed and a frame in which a long-time sampling operation with single-exposure is performed. Alternatively, image capturing may be performed while not only sequentially switching holding operations for each frame but also making the sampling operation switching unit 113 switch so as to repeat holding operations in a predetermined cycle, for example, performing the first holding operation twice and then performing the second holding operation once. Furthermore, it is possible to change the length of "H" level or "L" level of a signal waveform in each embodiment, as needed. For example, in the second and subsequent embodiments, "H" level in each transfer unit when obtaining a signal with a long exposure time is longer than "H" level when obtaining a signal with a short exposure time. These lengths may be equal to each other or the magnitude relation between them may be inverted. In addition, when charges are transferred from the photoelectric conversion unit to the charge holding unit and/or from the charge holding unit to the output unit, the charges may be transferred completely. In order to realize this charge transferring, the potential of the photoelectric conversion unit in an equilibrium state may be higher than the potential of the charge holding unit and the potential of the charge holding unit in an equilibrium state may be higher than the potential of the output unit. The potential as referred to herein is a potential for signal charges. Therefore, if electrons are signal charges, the lower an electrical potential is, the higher a potential is.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2014-255443, filed Dec. 17, 2014 and 2015-217008, filed Nov. 4, 2015, which are hereby incorporated by reference wherein in their entirety.

What is claimed is:

1. An image capturing apparatus comprising an image sensor and a control unit configured to control the image sensor, the image sensor including a plurality of pixels, each of the plurality of pixels including a photoelectric conversion unit, a charge holding unit, an output unit, a first transfer unit configured to transfer charge generated by the photoelectric conversion unit to the charge holding unit, and a second transfer unit configured to transfer charge held in the charge holding unit to the output unit, wherein the control unit causes the image sensor to repeatedly perform a holding operation and a transfer operation, the holding operation being for making the first transfer unit transfer charge generated by the photoelectric conversion unit to the charge holding unit to hold the charge, and the transfer operation being for making the second transfer unit transfer the charge held in the charge holding unit to the output unit, and the control unit causes the image sensor to perform, as the holding operation, one or more of a plurality of holding operations including a first holding operation and a second holding operation, the first holding operation being for performing, a plurality of times in a period of one frame, a first sampling operation of making the first transfer unit transfer charge generated by the photoelectric conversion unit in a first exposure time to the charge holding unit to hold the charge, and the second holding operation being for performing, not less than once in the period of one frame, a second sampling operation of making the first transfer unit transfer charge generated by the photoelectric conversion unit in a second exposure time longer than the first exposure time to the charge holding unit to hold the charge.

2. The apparatus according to claim 1, wherein each of the first sampling operation and the second sampling operation are simultaneously performed in the plurality of pixels.

3. The apparatus according to claim 1, wherein a period from the start of the transfer operation to the end of the transfer operation is the same length in each frame.

4. The apparatus according to claim 1, wherein a period, in the period of one frame, which extends from the start of the first sampling operation performed once to the start of the first sampling operation performed next is not more than ½ the period of one frame.

5. The apparatus according to claim 4, wherein a period, in the period of one frame, which extends from the start of the first sampling operation performed first to the end of the first sampling operation performed last is not less than ½ the period of one frame.

6. The apparatus according to claim 4, wherein a period, in the period of one frame, which extends from the start of the first sampling operation performed first to the end of the first sampling operation performed last is shorter than a period, in the period of one frame, which extends from the start of the second sampling operation performed first to the end of the second sampling operation performed last.

7. The apparatus according to claim 1, wherein a period, in the period of one frame, which extends from the start of the first sampling operation performed once to the start of the first sampling operation performed next is not more than ¼ the period of one frame.

8. The apparatus according to claim 1, wherein a period of the transfer operation in the period of one frame is not more than ½ the period of one frame.

9. The apparatus according to claim 1, wherein the plurality of holding operations further include a third holding operation of performing, a plurality of times in the period of one frame, a third sampling operation of making the first transfer unit transfer charge generated by the photoelectric conversion unit during a third exposure time longer than the first exposure time and shorter than the second exposure time to the charge holding unit to hold the charge.

10. The apparatus according to claim 1, wherein the control unit causes the image sensor to sequentially perform the plurality of holding operations.

11. The apparatus according to claim 1, further comprising an image combining unit, wherein
the image combining unit combines images obtained in at least two frames with different exposure times and outputs the combined image.

12. The apparatus according to claim 1, wherein each of the plurality of pixels includes two sets each including the charge holding unit, the first transfer unit, and the second transfer unit, and
the control unit causes one of the sets to perform the first holding operation and the other of the sets to perform the second holding operation in a period of the same frame.

13. The apparatus according to claim 12, wherein the control unit causes the image sensor to sequentially perform the first sampling operation and the second sampling operation.

14. The apparatus according to claim 12, wherein a time obtained by adding a sum of the first exposure times and a sum of the second exposure times in the period of one frame is not less than ½ the period of one frame.

15. The apparatus according to claim 1, wherein the plurality of pixels further include reset units configured to reset potentials of the photoelectric conversion units,
the reset units resetting charges in the photoelectric conversion units all together in the plurality of pixels before each of the first sampling operation and the second sampling operation.

16. The apparatus according to claim 15, wherein each of the reset units has an overflow drain structure.

17. The apparatus according to claim 1, wherein the period of one frame is equal to a cycle of commercial power supply or ½ the cycle.

18. A driving method for an image sensor including a plurality of pixels,
each of the plurality of pixels including a photoelectric conversion unit, a charge holding unit, an output unit, a first transfer unit configured to transfer charge generated by the photoelectric conversion unit to the charge holding unit, and a second transfer unit configured to transfer charge held in the charge holding unit to the output unit,
wherein the driving method for the image sensor comprises performing repeated operations,
the operations include making the first transfer unit transfer charge generated by the photoelectric conversion unit to the charge holding unit to hold the charge and making the second transfer unit transfer the charge held in the charge holding unit to the output unit, and
as the making the first transfer unit transfer the charge, one or more of a plurality of holding operations are performed, including performing, a plurality of times in a period of one frame, a first sampling operation of making the first transfer unit transfer charge generated by the photoelectric conversion unit in a first exposure time to the charge holding unit to hold the charge, and performing, not less than once in the period of one frame, a second sampling operation of making the first transfer unit transfer charge generated by the photoelectric conversion unit in a second exposure time longer than the first exposure time to the charge holding unit to hold the charge.

19. A driving method for an image sensor including a plurality of pixels,
    each of the plurality of pixels including a photoelectric conversion unit, a charge holding unit, an output unit, a first transfer unit configured to transfer charge generated by the photoelectric conversion unit to the charge holding unit, and a second transfer unit configured to transfer charge held in the charge holding unit to the output unit,
    wherein the driving method comprises a first holding step and a second holding step,
    the first holding step comprises performing a plurality of first sampling operations,
    the second holding step comprises performing at least one second sampling operation,
    each of the plurality of first sampling operations includes making the first transfer unit transfer charge generated by the photoelectric conversion unit in a first exposure time to the charge holding unit to hold the charge,
    the at least one second sampling operation includes making the first transfer unit transfer charge generated by the photoelectric conversion unit in a second exposure time longer than the first exposure time to the charge holding unit to hold the charge, and
    the second holding step is performed between two of the first holding steps.

20. The method according to claim 19, wherein each of the plurality of first sampling operations and the at least one second sampling operation is performed simultaneously in the plurality of pixels.

21. The method according to claim 19, wherein charges that are transferred in the plurality of the first sampling operations in the first holding step are added to each other in the charge holding unit.

* * * * *